US012143584B2

(12) United States Patent
Kanoh et al.

(10) Patent No.: US 12,143,584 B2
(45) Date of Patent: *Nov. 12, 2024

(54) DECODER, DECODING METHOD, ENCODER AND NON-TRANSITORY COMPUTER READABLE MEDIUM STORING A BITSTREAM

(71) Applicant: Panasonic Intellectual Property Corporation of America, Torrance, CA (US)

(72) Inventors: Ryuichi Kanoh, Osaka (JP); Tadamasa Toma, Osaka (JP); Kiyofumi Abe, Osaka (JP); Takahiro Nishi, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,289

(22) Filed: Oct. 22, 2021

(65) Prior Publication Data

US 2022/0046241 A1 Feb. 10, 2022

Related U.S. Application Data

(63) Continuation of application No. 16/023,538, filed on Jun. 29, 2018, now Pat. No. 11,184,612.

(Continued)

(51) Int. Cl.
*H04N 19/12* (2014.01)
*H04N 19/14* (2014.01)
(Continued)

(52) U.S. Cl.
CPC ............ *H04N 19/12* (2014.11); *H04N 19/14* (2014.11); *H04N 19/147* (2014.11);
(Continued)

(58) Field of Classification Search
CPC .... H04N 19/12; H04N 19/625; H04N 19/122; H04N 19/18
See application file for complete search history.

(56) References Cited

U.S. PATENT DOCUMENTS

| 11,184,612 B2* | 11/2021 | Kanoh | ............... H04N 19/61 |
| 2012/0082391 A1* | 4/2012 | Fernandes | ........... H04N 19/122 |
| | | | 382/233 |

(Continued)

OTHER PUBLICATIONS

Chen, Algorithm Description of Joint Exploration Test Model 6 (JEM 6), Joint Video Exploration Team (JVET) of ITU-T SG 16 WP 3 and ISO/IEC JTC 1/SC 29/WG 11 6th Meeting: Hobart, AU, Mar. 31-Apr. 7, 2017, JVET-F1001-v2 (Year: 2017).*

(Continued)

*Primary Examiner* — Daniel Chang
(74) *Attorney, Agent, or Firm* — Wenderoth, Lind & Ponack, L.L.P.

(57) ABSTRACT

A decoder comprising a processor and a memory, wherein the processor, using the memory, inverse quantizes data corresponding to a current block of an image performs an inverse secondary transform, using one candidate of the inverse secondary transform selected from candidates of the inverse secondary transform, on a result of the inverse quantization to generate second transform coefficients, the candidates of the inverse secondary transform including transform bases for the inverse secondary transform and a skip of the inverse secondary transform and performs an inverse primary transform, using one candidate of the inverse primary transform selected from candidates of the inverse primary transform, on the second transform coefficients or the result of the inverse quantization to generate first transform coefficients, the candidates of the inverse primary transform including transform bases for the inverse primary transform.

5 Claims, 28 Drawing Sheets

Related U.S. Application Data

(60) Provisional application No. 62/528,222, filed on Jul. 3, 2017.

(51) Int. Cl.
  H04N 19/147    (2014.01)
  H04N 19/176    (2014.01)
  H04N 19/46     (2014.01)
  H04N 19/61     (2014.01)
  H04N 19/65     (2014.01)
  H04N 19/119    (2014.01)

(52) U.S. Cl.
  CPC ........... H04N 19/176 (2014.11); H04N 19/46 (2014.11); H04N 19/61 (2014.11); H04N 19/65 (2014.11); H04N 19/119 (2014.11)

(56) References Cited

U.S. PATENT DOCUMENTS

| | | | | |
|---|---|---|---|---|
| 2012/0170649 | A1* | 7/2012 | Chen | H04N 19/122 |
| | | | | 375/240.18 |
| 2012/0195377 | A1* | 8/2012 | Auyeung | H04N 19/176 |
| | | | | 375/E7.243 |
| 2012/0320972 | A1* | 12/2012 | Ma | H04N 19/12 |
| | | | | 375/240.03 |
| 2013/0003856 | A1* | 1/2013 | Saxena | H04N 19/12 |
| | | | | 375/240.18 |
| 2013/0301705 | A1* | 11/2013 | Seregin | H04N 19/18 |
| | | | | 375/240.02 |
| 2014/0254661 | A1* | 9/2014 | Saxena | H04N 19/625 |
| | | | | 375/240.2 |
| 2017/0094314 | A1* | 3/2017 | Zhao | H04N 19/625 |
| 2017/0280163 | A1* | 9/2017 | Kao | H04N 19/593 |
| 2017/0324643 | A1* | 11/2017 | Seregin | H04N 19/132 |
| 2018/0098064 | A1* | 4/2018 | Seregin | H04N 19/159 |
| 2019/0007682 | A1* | 1/2019 | Kanoh | H04N 19/12 |
| 2019/0104322 | A1* | 4/2019 | Tsukuba | H04N 19/61 |
| 2019/0208203 | A1* | 7/2019 | Tsukuba | H04N 19/46 |
| 2019/0268594 | A1* | 8/2019 | Lim | H04N 19/19 |
| 2019/0297325 | A1* | 9/2019 | Lim | H04N 19/517 |
| 2019/0306536 | A1* | 10/2019 | Lim | H04N 19/146 |
| 2019/0313095 | A1* | 10/2019 | Ikeda | H04N 19/157 |
| 2019/0387241 | A1* | 12/2019 | Kim | H04N 19/46 |
| 2020/0014924 | A1* | 1/2020 | Zhao | H04N 19/46 |
| 2020/0177889 | A1* | 6/2020 | Kim | H04N 19/70 |
| 2020/0275116 | A1* | 8/2020 | Bang | H04N 19/513 |
| 2020/0275124 | A1* | 8/2020 | Ko | H04N 19/11 |
| 2020/0280735 | A1* | 9/2020 | Lim | H04N 19/523 |
| 2020/0288134 | A1* | 9/2020 | Lim | H04N 19/167 |
| 2021/0120269 | A1* | 4/2021 | Chen | H04N 19/119 |
| 2021/0243475 | A1* | 8/2021 | Tsukuba | H04N 19/12 |
| 2021/0297701 | A1* | 9/2021 | Tsukuba | H04N 19/124 |
| 2022/0046241 | A1* | 2/2022 | Kanoh | H04N 19/147 |
| 2022/0264151 | A1* | 8/2022 | Lim | H04N 19/61 |

OTHER PUBLICATIONS

Tsukuba et al.; "EE2.7-related: On secondary transform when primary transform is skipped;" Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0045 (Year: 2016).*

H.265 (ISO/IEC 23008-2 High efficiency video coding (HEVC)), "8.6.4 Transformation process for scaled transform coefficients", Dec. 1, 2013, pp. 142-144.

Tsukuba et al., "On Adaptive Multiple Core Transform for Chroma", Joint Video Exploration Team (JVET) of ITU-T SG 16 WP 3 and ISO/IEC JTC 1/SC 29/WG 11, 5th Meeting: Geneva, CH, Jan. 12-20, 2017, Document: JVET-E0036 (Year: 2017).

Jang et al., "Signaling for primary transform and transform skip", Joint Video Exploration Team (JVET) of ITU-T SG 16 WP 3 and ISO/IEC JTC 1/SC 29/WG 11, 5th Meeting: Geneva, CH, Jan. 12-20, 2017, Document: JVET-E0037 (Year: 2017).

Jang et al., "Reduction redundant syntax signaling for transform skip", Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, Document: JVET-F0031 (Year: 2017).

Chen et al., "Algorithm Description of Joint Exploration Test Model 4", JVET-D100_1_v3 Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 22-28. (Year: 2016).

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

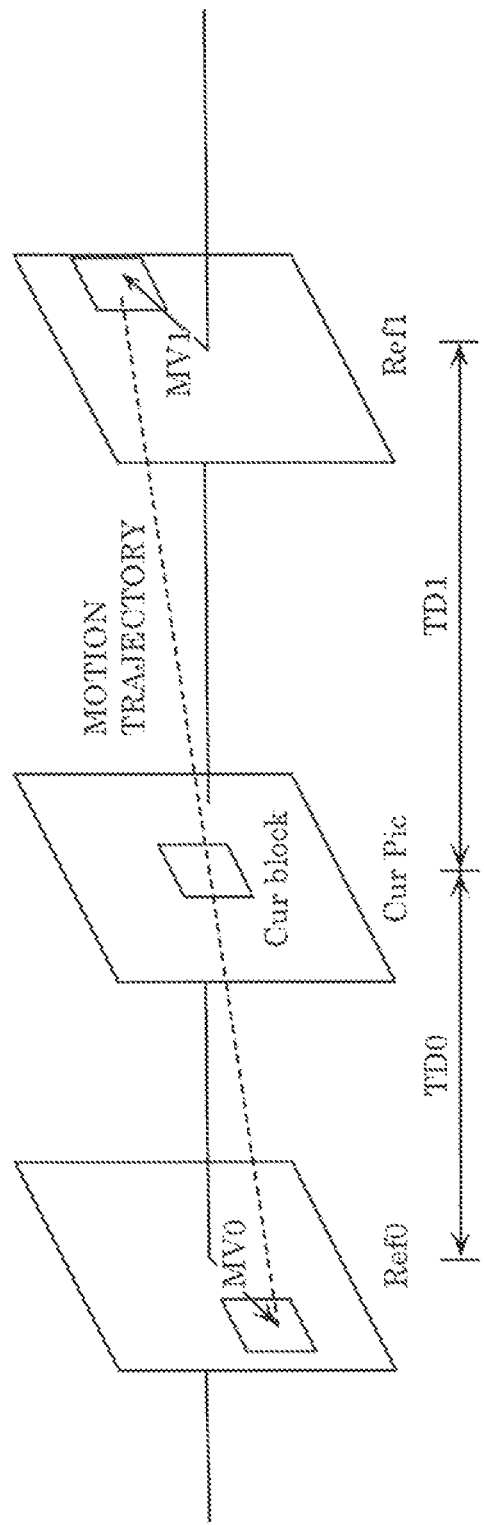

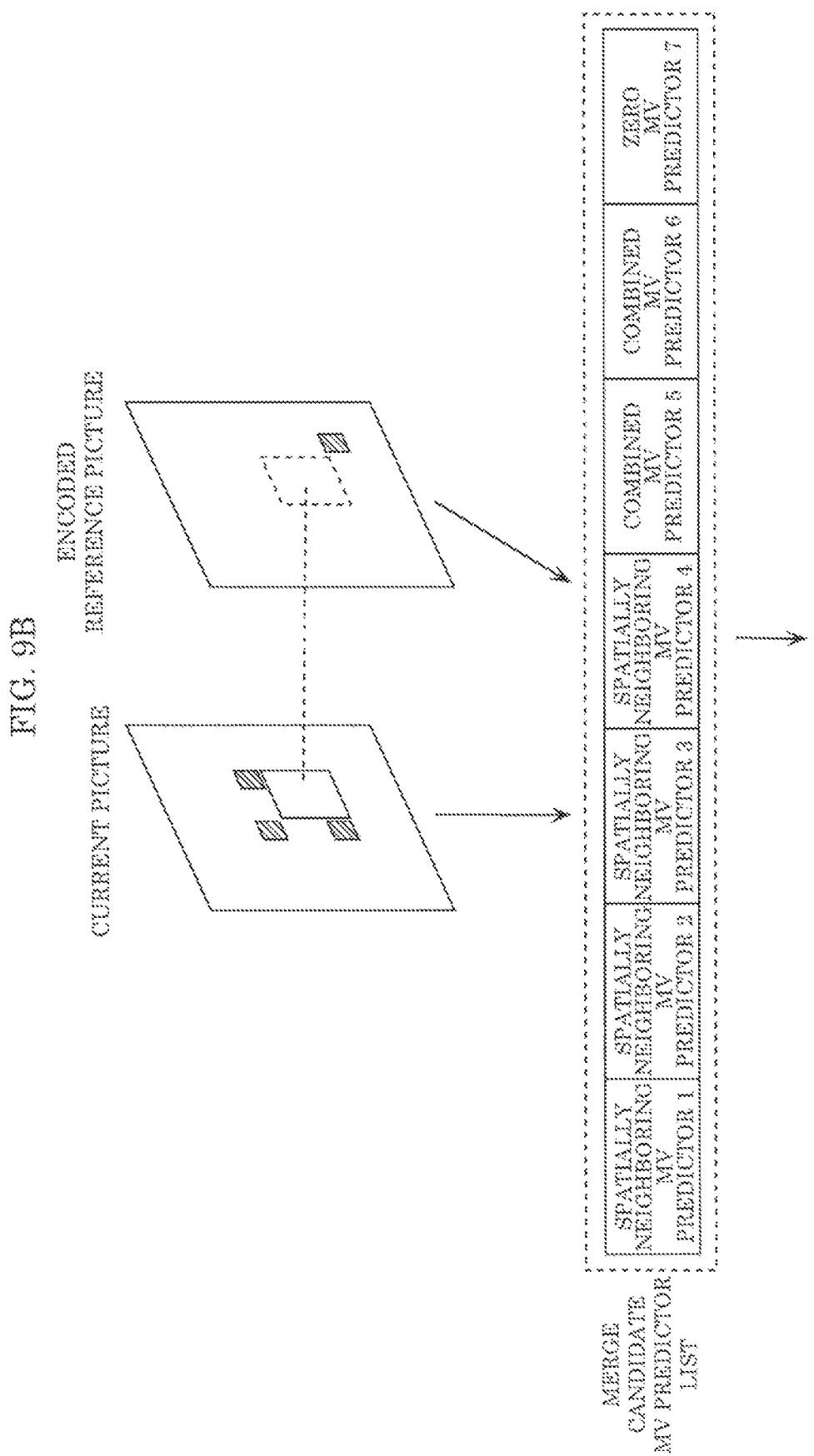

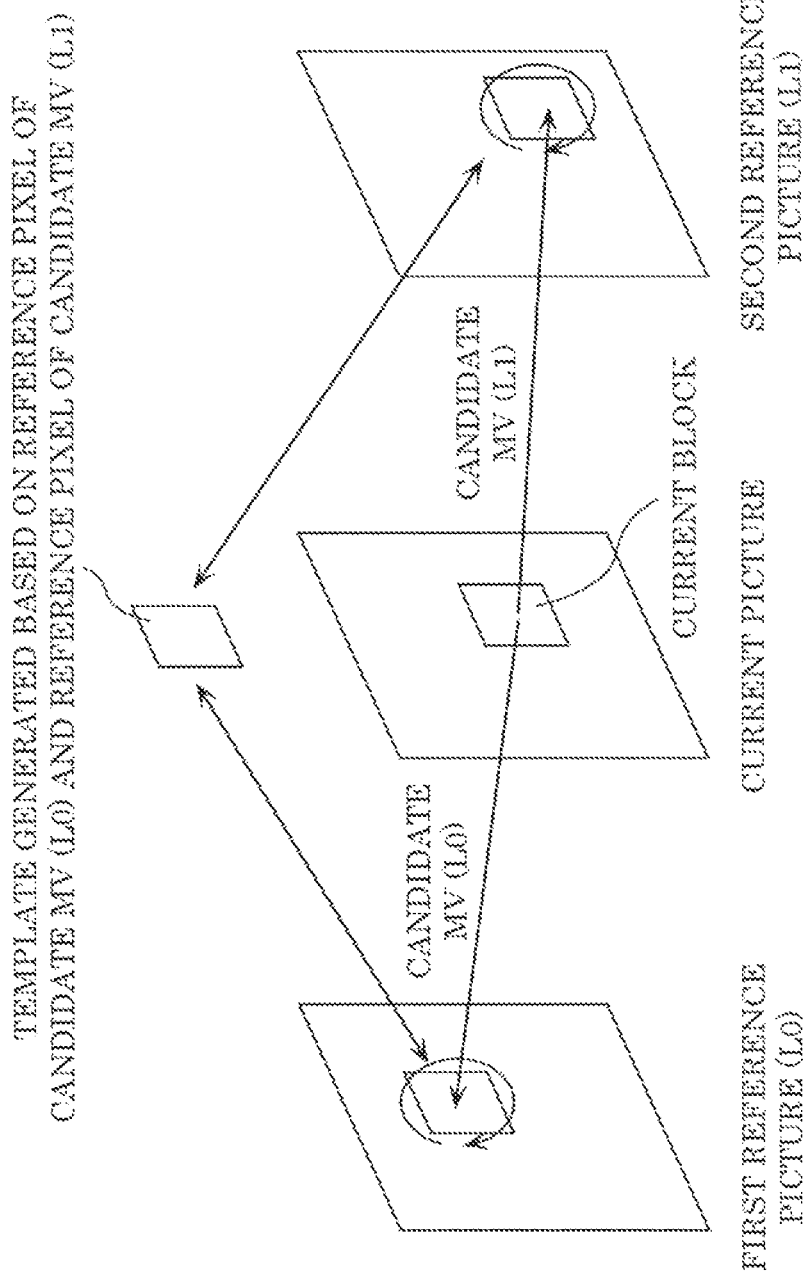

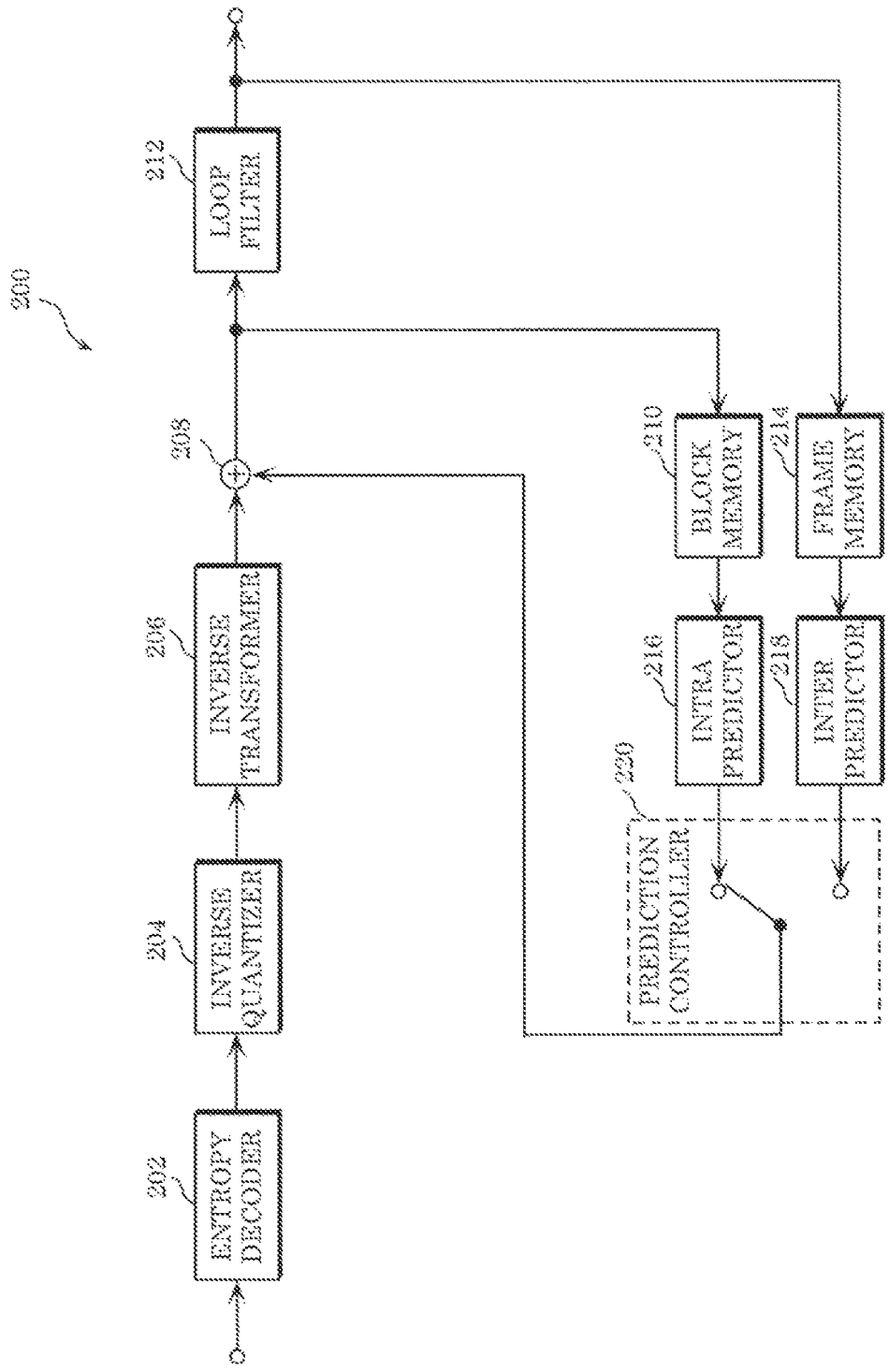

DECODER, DECODING METHOD, ENCODER AND NON-TRANSITORY COMPUTER READABLE MEDIUM STORING A BITSTREAM

FIELD

The present disclosure relates to an encoder, etc., which codes a moving picture.

BACKGROUND

As a standard for coding a moving picture, there has conventionally been H.265 that is also referred to as high efficiency video coding (HEVC).

CITATION LIST

Non Patent Literature

[NPL 1] H.265 (ISO/IEC 23008-2 HEVC)/HEVC (High Efficiency Video Coding)

SUMMARY

Technical Problem

However, it is not easy to appropriately determine a transform basis to be used in coding, etc., of a moving picture while reducing increase in processing amount.

In view of this, non-limiting and exemplary embodiments provide an encoder, etc., capable of appropriately determining transform bases while reducing increase in processing amount.

Solution to Problem

An encoder according to an aspect of the present disclosure codes a moving picture, the encoder including: a processor; and a memory, wherein the processor, using the memory: subtracts a prediction image of an image included in the moving picture from the image so as to derive a prediction error of the image; sequentially selects a plurality of transform basis candidates for a transform basis to be used to perform transform of the prediction error; derives an evaluation value of a transform basis candidate selected out of the plurality of transform basis candidates; compares the evaluation value with a threshold value; based on a result of the comparison, skips selection of one or more transform basis candidates that have not been selected out of the plurality of transform basis candidates; determines the transform basis from one or more transform basis candidates selected out of the plurality of transform basis candidates; performs the transform of the prediction error, using the transform basis; quantizes a result of the transform; and codes a result of the quantization as data of the image.

These general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Further benefits and advantageous effects provided by the disclosed embodiments are known from the Specification and the drawings. These benefits and advantageous effects may be provided by various embodiments and/or each of the features in the Specification and the drawings, and all of these benefits and advantageous effects do not always need to be provided.

Advantageous Effects

The encoder, etc., according to an aspect of the present disclosure is capable of appropriately determining transform bases while reducing increase in processing amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 6 is for illustrating pattern matching (bilateral matching) between two blocks along a motion trajectory.

FIG. 9B is for illustrating an outline of a process for deriving a motion vector via merge mode.

FIG. 9C is a conceptual diagram for illustrating an outline of DMVR processing.

FIG. 10 is a block diagram illustrating a functional configuration of the decoding device according to Embodiment 1.

Figure 1:
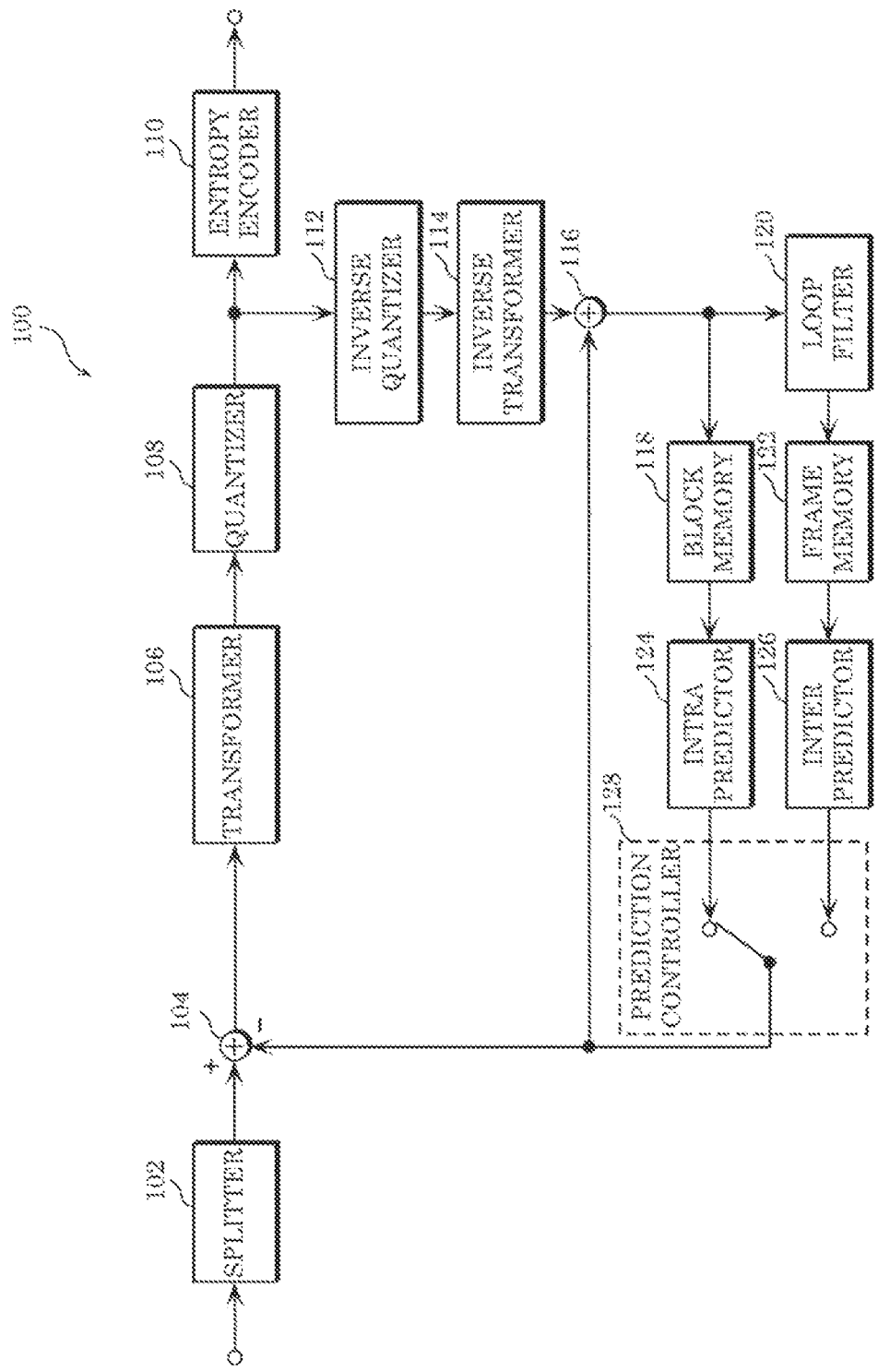
FIG. 1 is a block diagram illustrating a functional configuration of the encoding device according to Embodiment 1.

DESCRIPTION OF EMBODIMENTS (Underlying Knowledge Forming Basis of the Present Disclosure)

For example, an encoder derives a prediction error by subtracting a prediction image from an image included in a moving picture when coding the moving picture. The encoder performs frequency transform and quantization on the prediction error, and codes the result as data of the image.

In a natural image, the amount of frequency components is comparatively small. Accordingly, frequency transform centralizes information at the low frequency side, which enables efficient coding. In addition, quantization removes the comparatively small amount of high frequency components, reducing the amount of information. The high frequency components less affect image quality, and thus the harmful effect of image quality deterioration is small.

For example, since the amount of high frequency components is comparatively small, frequency transform and quantization sequentially generates coefficients each having a value of 0 in the high frequency region. Here, the coefficients each having a value of 0 is referred to as a zero coefficient, and coefficients each having a value other than 0 is referred to as a non-zero coefficient. The encoder is capable of reducing the coding amount of zero coefficients generated sequentially. Accordingly, the encoder is capable of reducing the total coding amount by performing frequency transform and quantization.

In addition, the frequency transform is performed using a transform basis. For example, the encoder determines a transform basis out of a plurality of transform basis candidates, and performs frequency transform using the determined transform basis.

In addition, the decoder performs an operation corresponding to the operation performed by the encoder. More specifically, the decoder decodes data of an image. Subsequently, the decoder performs inverse quantization and inverse frequency transform on the data of the image. Subsequently, the decoder derives the image by adding, as a prediction error, the result of the inverse quantization and inverse frequency transform to a prediction image.

In addition, the inverse frequency transform is also performed using a transform basis. For example, the decoder determines a transform basis corresponding to the transform basis used in the transform out of the plurality of transform basis candidates, and performs inverse frequency transform using the determined transform basis.

In addition, the encoder may perform secondary transform so that a larger number of zero coefficients are generated sequentially, after the frequency transform and before the quantization. In this case, the frequency transform is also represented as primary transform. The primary transform is not limited to frequency transform, and may be another orthogonal transform, or the like. The secondary transform is basically an orthogonal transform.

For example, the encoder determines a primary transform basis out of a plurality of primary transform basis candidates, determines a secondary transform basis out of a plurality of secondary transform basis candidates, performs primary transform on a prediction error using the primary transform basis, and performs secondary transform on the result of the primary transform using the secondary transform basis. In this case, the decoder performs inverse secondary transform on the result of the inverse quantization using the inverse secondary transform basis corresponding to the secondary transform basis, and performs inverse primary transform on the result of the inverse secondary transform using the inverse primary transform basis corresponding to the primary transform basis.

The secondary transform performed in addition to the primary transform may further reduce the coding amount.

However, it is not easy to appropriately determine a transform basis while reducing increase in the processing amount. For example, when the encoder derives an evaluation value for each of the plurality of transform basis candidates and determines the transform basis candidate that provides the highest evaluation value as a transform basis, the encoder is capable of appropriately determining the transform basis, but requires a large processing amount to derive the evaluation value.

In view of this, an encoder which codes a moving picture according to an aspect of the present disclosure includes: a processor; and a memory, wherein the processor, using the memory: subtracts a prediction image of an image included in the moving picture from the image so as to derive a prediction error of the image; sequentially selects a plurality of transform basis candidates for a transform basis to be used to perform transform of the prediction error; derives an evaluation value of a transform basis candidate selected out of the plurality of transform basis candidates; compares the evaluation value with a threshold value; based on a result of the comparison, skips selection of one or more transform basis candidates that have not been selected out of the plurality of transform basis candidates; determines the transform basis from one or more transform basis candidates selected out of the plurality of transform basis candidates; performs the transform of the prediction error, using the transform basis; quantizes a result of the transform; and codes a result of the quantization as data of the image.

In this way, the encoder is capable of skipping evaluation of another transform basis candidate, based on the result of the comparison between the evaluation value of the transform basis candidate evaluated and the threshold value. Subsequently, the encoder is capable of determining the transform basis from the one or more transform basis candidates evaluated. Accordingly, the encoder is capable of appropriately determining the transform basis while reducing increase in the processing amount.

In addition, for example, the transform includes primary transform and secondary transform, the transform basis is a combination of a primary transform basis that is a transform basis for use in the primary transform and a secondary transform basis that is a transform basis for use in the secondary transform, and each of the plurality of transform basis candidates is a combination of one of a plurality of primary transform basis candidates for the primary transform basis and one of a plurality of secondary transform basis candidates for the secondary transform basis.

In this way, the encoder is capable of appropriately determining the primary transform basis and the secondary transform basis out of the plurality of primary transform basis candidates and the plurality of secondary transform basis candidates.

In addition, for example, the processor: sequentially selects the plurality of transform basis candidates by sequentially selecting the plurality of primary transform basis candidates and sequentially selecting the plurality of secondary transform basis candidates; and based on the result of the comparison, skips the selection of the one or more transform basis candidates that have not been selected out of the plurality of transform basis candidates by ending the sequential selection of the plurality of primary transform basis candidates and ending the sequential selection of the plurality of secondary transform basis candidates.

In this way, the encoder is capable of ending both the sequential selection of the plurality of primary transform basis candidates and the sequential selection of the plurality of secondary transform basis candidates, while reducing increase in the processing amount.

In addition, for example, the processor: sequentially selects the plurality of transform basis candidates by sequentially selecting the plurality of primary transform basis candidates and sequentially selecting the plurality of secondary transform basis candidates; and based on the result of the comparison, skips the selection of the one or more transform basis candidates that have not been selected out of the plurality of transform basis candidates by skipping one of selection of one or more primary transform basis candidates that have not been selected out of the plurality of primary transform basis candidates and selection of one or more secondary transform basis candidates that have not been selected out of the plurality of secondary transform basis candidates.

In this way, the encoder is capable of skipping the selection of the one or more of the plurality of primary transform basis candidates and the selection of the one or more of the plurality of secondary transform basis candidates, while reducing increase in the processing amount.

In addition, for example, when the result of the comparison shows that the evaluation value is better than the threshold value, the processor skips the selection of the one or more transform basis candidates that have not been selected out of the plurality of transform basis candidates.

In this way, the encoder is capable of skipping evaluation of the other transform basis candidate when the evaluation value is better than the threshold value. Subsequently, the encoder is capable of determining the transform basis from the one or more transform basis candidates evaluated. Accordingly, the encoder is capable of appropriately determining the transform basis while reducing increase in the processing amount.

In addition, for example, the processor determines the threshold value using an evaluation value of another transform basis candidate selected before the transform basis candidate selected.

In this way, the encoder is capable of appropriately determining the transform basis, using the threshold value determined relative to the evaluation value of the other transform basis candidate evaluated.

In addition, for example, the processor determines the threshold value using a parameter to be coded when coding the moving picture.

In this way, the encoder is capable of appropriately determining the transform basis, using the threshold value determined by the coding-related parameter.

In addition, for example, when the transform basis candidate selected is a predetermined transform basis candidate, the processor skips the selection of the one or more transform basis candidates that have not been selected out of the plurality of transform basis candidates, based on the result of the comparison.

In this way, regarding the predetermined transform basis candidate evaluated, the encoder is capable of skipping evaluation of the other transform basis candidate, based on the result of the comparison between the evaluation value and the threshold value.

In addition, for example, when a size of the transform is a predetermined size, the processor skips the selection of the one or more transform basis candidates that have not been selected out of the plurality of transform basis candidates, based on the result of the comparison.

In this way, regarding the transform of the predetermined size, the encoder is capable of skipping evaluation of the other transform basis candidate, based on the result of the comparison between the evaluation value and the threshold value.

In addition, for example, the processor codes information indicating the transform basis that is determined based on the result of the comparison.

In this way, the encoder is capable of notifying the information indicating the transform basis determined appropriately.

In addition, for example, a decoder which decodes a moving picture according to an aspect of the present disclosure includes: a processor; and a memory, wherein the processor, using the memory: decodes data of an image included in the moving picture; decodes information indicating a transform basis determined based on a result of comparison between an evaluation value of a transform basis candidate and a threshold value; performs inverse quantization of the data decoded; performs inverse transform of a result of the inverse quantization, using the transform basis indicated by the information decoded; and derives the image by adding, as a prediction error of the image, a result of the inverse transform to a prediction image of the image.

In this way, the decoder is capable of obtaining the information indicating the transform basis determined appropriately. Subsequently, the decoder is capable of performing the inverse transform using the transform basis determined appropriately.

In addition, for example, an encoder for coding a moving picture according to an aspect of the present disclosure includes: a processor; and a memory, wherein the processor, using the memory: subtracts a prediction image of an image included in the moving picture from the image so as to derive a prediction error of the image; sequentially selects a plurality of transform basis candidates for a transform basis to be used to perform transform of the prediction error; derives an evaluation value of a transform basis candidate selected out of the plurality of transform basis candidates; compares the evaluation value with a threshold value; based on a result of the comparison, skips selection of one or more transform basis candidates that have not been selected out of the plurality of transform basis candidates; determines the transform basis from one or more transform basis candidates selected out of the plurality of transform basis candidates; performs the transform of the prediction error, using the transform basis; quantizes a result of the transform; and codes a result of the quantization as data of the image.

In this way, it is possible to skip evaluation of the other transform basis candidate, based on the result of the comparison between the evaluation value of the transform basis candidate evaluated and the threshold value. Subsequently, the encoder is capable of determining the transform basis from the one or more transform basis candidates evaluated. Accordingly, the encoder is capable of appropriately determining the transform basis while reducing increase in the processing amount.

In addition, for example, a decoding method for decoding a moving picture according to an aspect of the present disclosure includes: decoding data of an image included in the moving picture; decoding information indicating a transform basis determined based on a result of comparison between an evaluation value of a transform basis candidate and a threshold value; performing inverse quantization of the data decoded; performing inverse transform of a result of the inverse quantization, using the transform basis indicated by the information decoded; and deriving the image by adding, as a prediction error of the image, a result of the inverse transform to a prediction image of the image.

In this way, it is possible to obtain the information indicating the transform basis determined appropriately. Subsequently, it is possible to perform inverse transform using the transform basis determined appropriately.

Furthermore, these general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoding device and a decoding device to which the processes and/or configurations presented in subsequent description of aspects of the present disclosure are applicable. Note that Embodiment 1 is merely one example of an encoding device and a decoding device to which the processes and/or configurations presented in the description of aspects of the present disclosure are applicable. The processes and/or configurations presented in the description of aspects of the present disclosure can also be implemented in an encoding device and a decoding device different from those according to Embodiment 1.

When the processes and/or configurations presented in the description of aspects of the present disclosure are applied to Embodiment 1, for example, any of the following may be performed.

(1) regarding the encoding device or the decoding device according to Embodiment 1, among components included in the encoding device or the decoding device according to Embodiment 1, substituting a component corresponding to a component presented in the description of aspects of the present disclosure with a component presented in the description of aspects of the present disclosure;

(2) regarding the encoding device or the decoding device according to Embodiment 1, implementing discretionary changes to functions or implemented processes performed by one or more components included in the encoding device or the decoding device according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoding device or the decoding device according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoding device or the decoding device according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoding device or the decoding device according to Embodiment 1, or a component that implements one or more processes implemented by one or more components included in the encoding device or the decoding device according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoding device or the decoding device according to Embodiment 1, among processes included in the method, substituting a process corresponding to a process presented in the description of aspects of the present disclosure with a process presented in the description of aspects of the present disclosure; and (7) combining one or more processes included in the method implemented by the encoding device or the decoding device according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoding device or the moving picture/picture decoding device disclosed in Embodiment 1. Moreover, the processes and/or configurations presented in the description of aspects of the present disclosure may be independently implemented. Moreover, processes and/or configurations described in different aspects may be combined.

[Encoding Device Outline]

First, the encoding device according to Embodiment 1 will be outlined. FIG. 1 is a block diagram illustrating a functional configuration of encoding device 100 according to Embodiment 1. Encoding device 100 is a moving picture/picture encoding device that encodes a moving picture/picture block by block.

As illustrated in FIG. 1, encoding device 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoding device 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoding device 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoding device 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
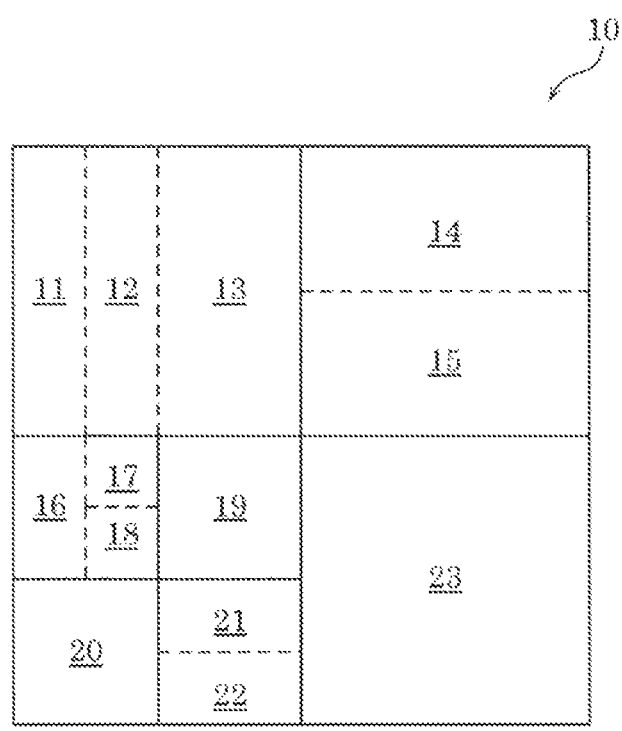
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split. As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoding device 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array. Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
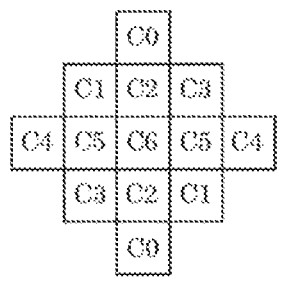
FIG. 4A illustrates one example of a filter shape used in ALF.
Figure 4B:
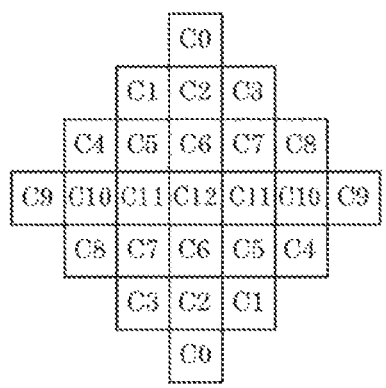
FIG. 4B illustrates another example of a filter shape used in ALF.
Figure 4C:
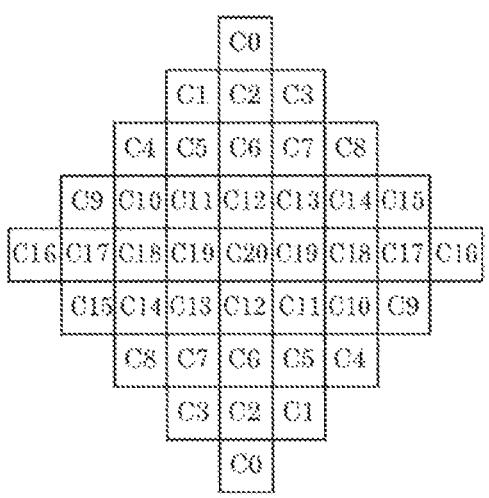
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
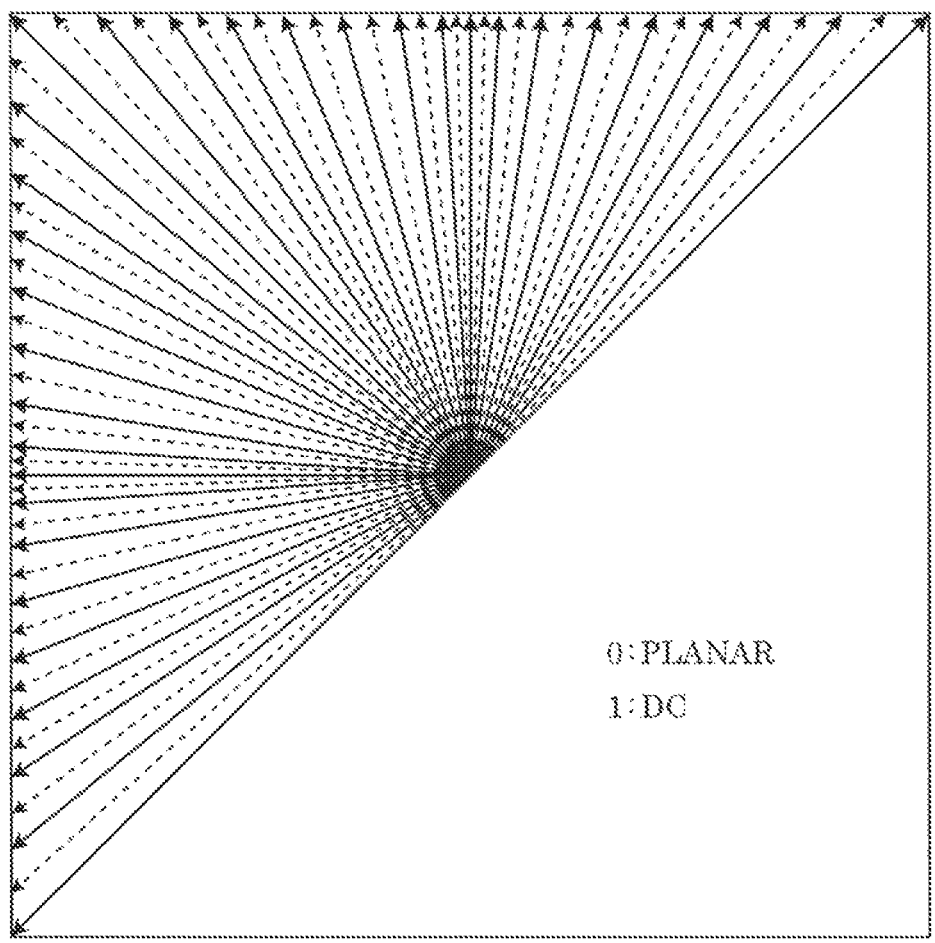
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
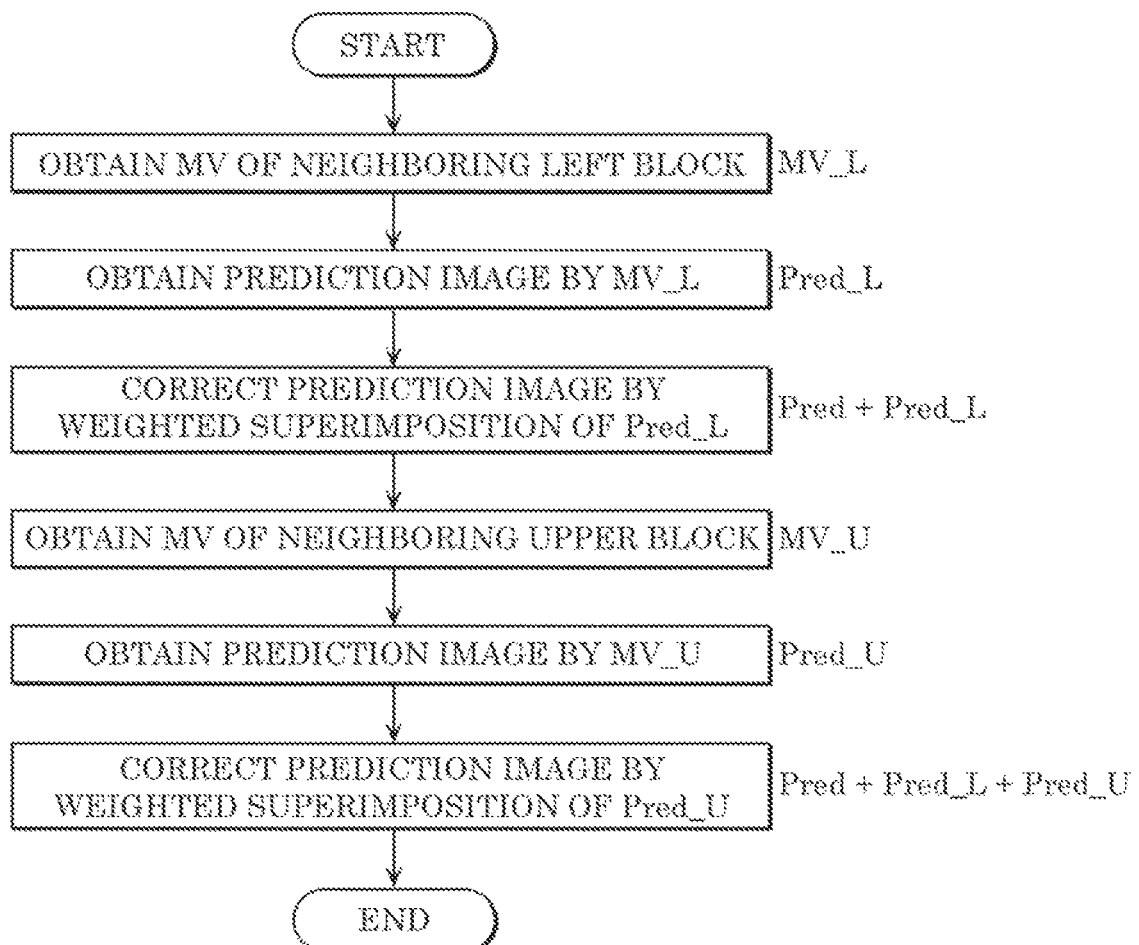
FIG. 5B is a flow chart for illustrating an outline of a prediction image correction process performed via OBMC processing.
Figure 5C:
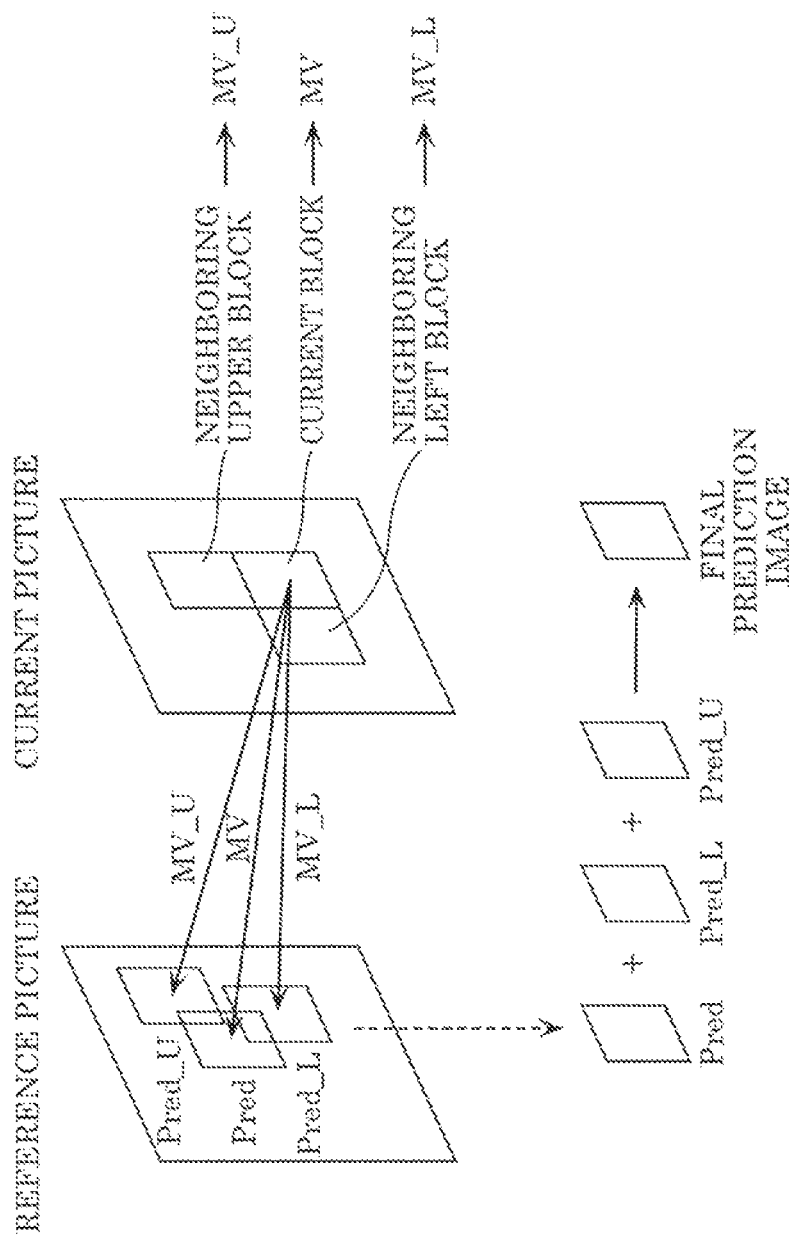
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoding device determines whether the current block belongs to a region including complicated motion. The encoding device sets the obmc_flag to a value of "1" when the block belongs to a region including complicated motion and implements OBMC processing when encoding, and sets the obmc_flag to a value of "0" when the block does not belong to a region including complicated motion and encodes without implementing OBMC processing. The decoding device switches between implementing OBMC processing or not by decoding the obmc_flag written in the stream and performing the decoding in accordance with the flag value.

Note that the motion information may be derived on the decoding device side without being signalled. For example, a merge mode defined in the H.265/HEVC standard may be used. Moreover, for example, the motion information may be derived by performing motion estimation on the decoding device side. In this case, motion estimation is performed without using the pixel values of the current block.

Here, a mode for performing motion estimation on the decoding device side will be described. A mode for performing motion estimation on the decoding device side is also referred to as pattern matched motion vector derivation (PMMVD) mode or frame rate up-conversion (FRUC) mode.

Figure 5D:
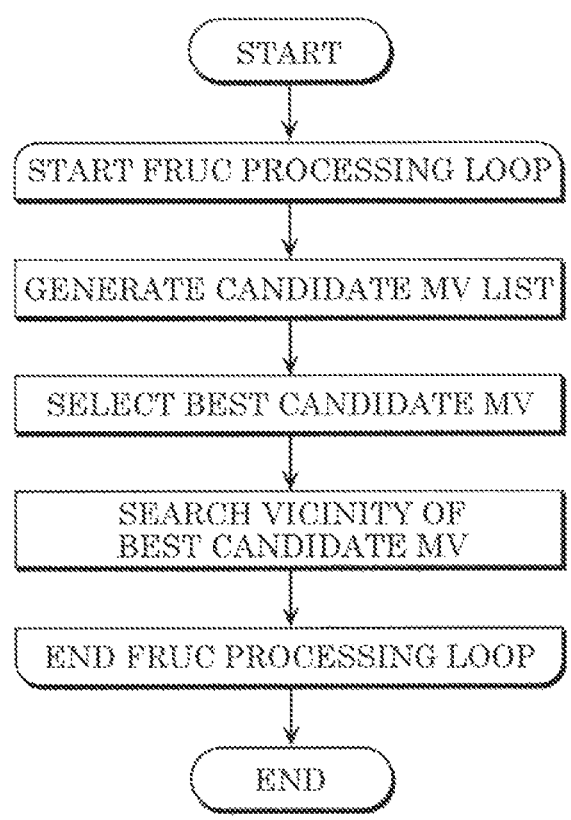
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Rem) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
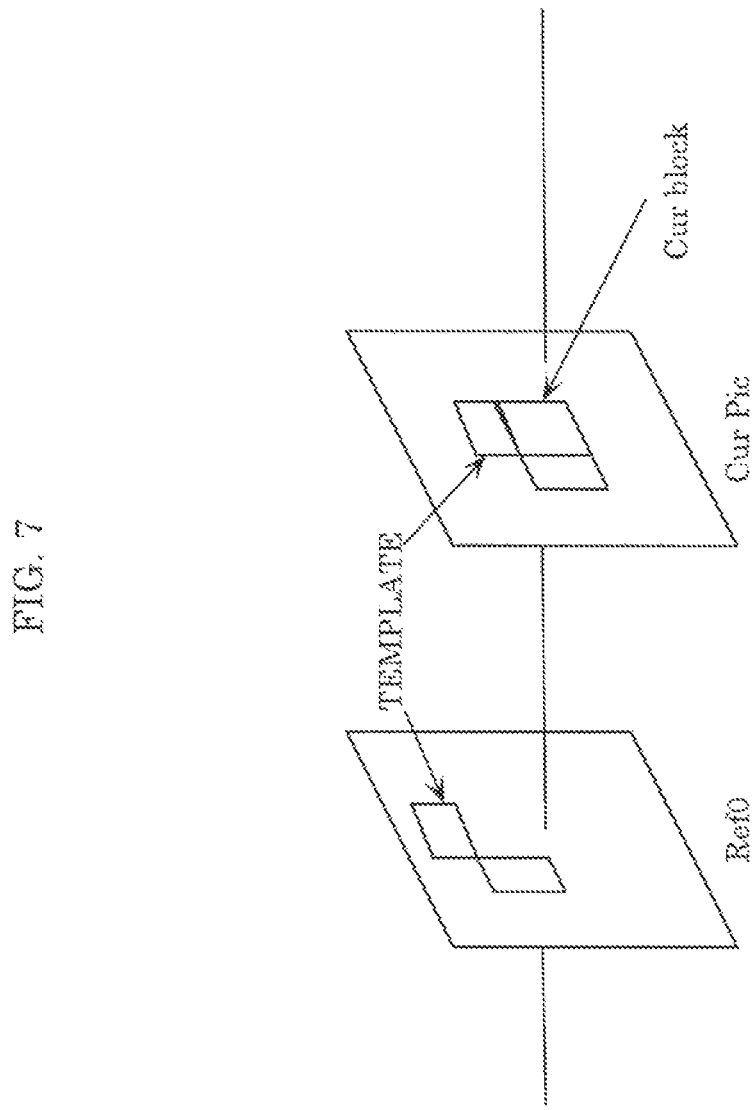
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
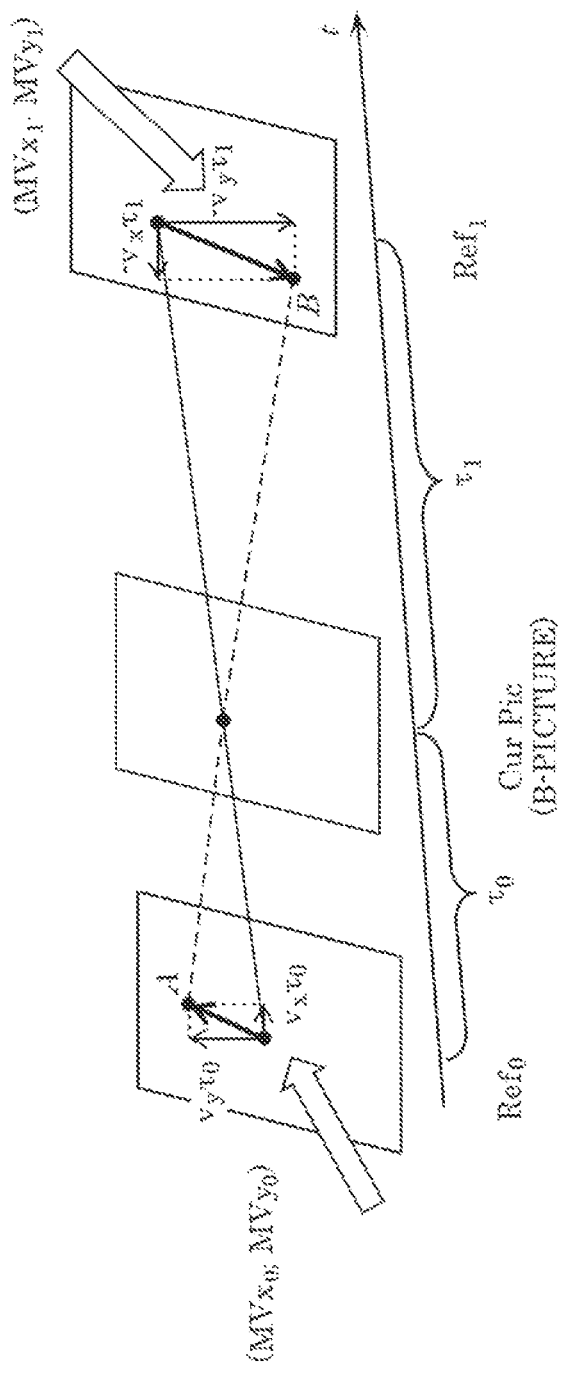
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoding device side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
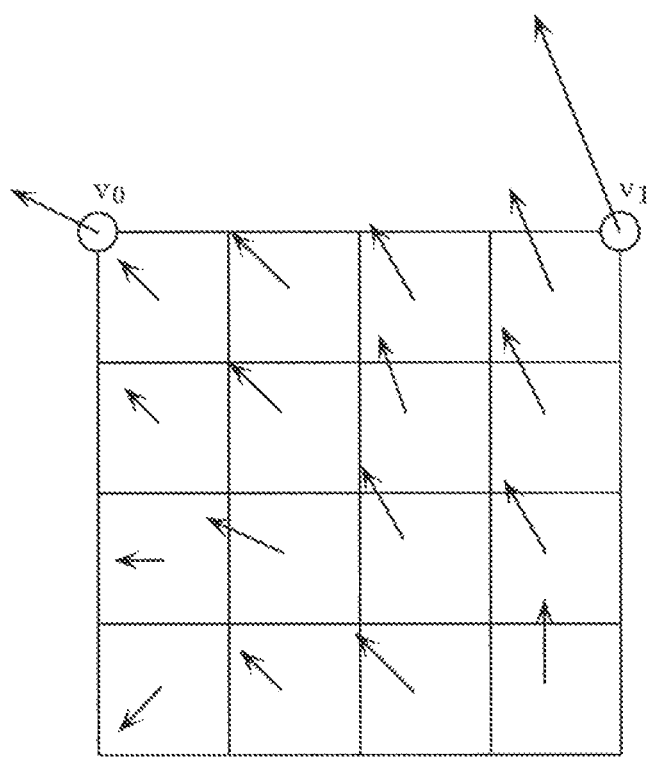
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoding device, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoding device and the decoding device.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
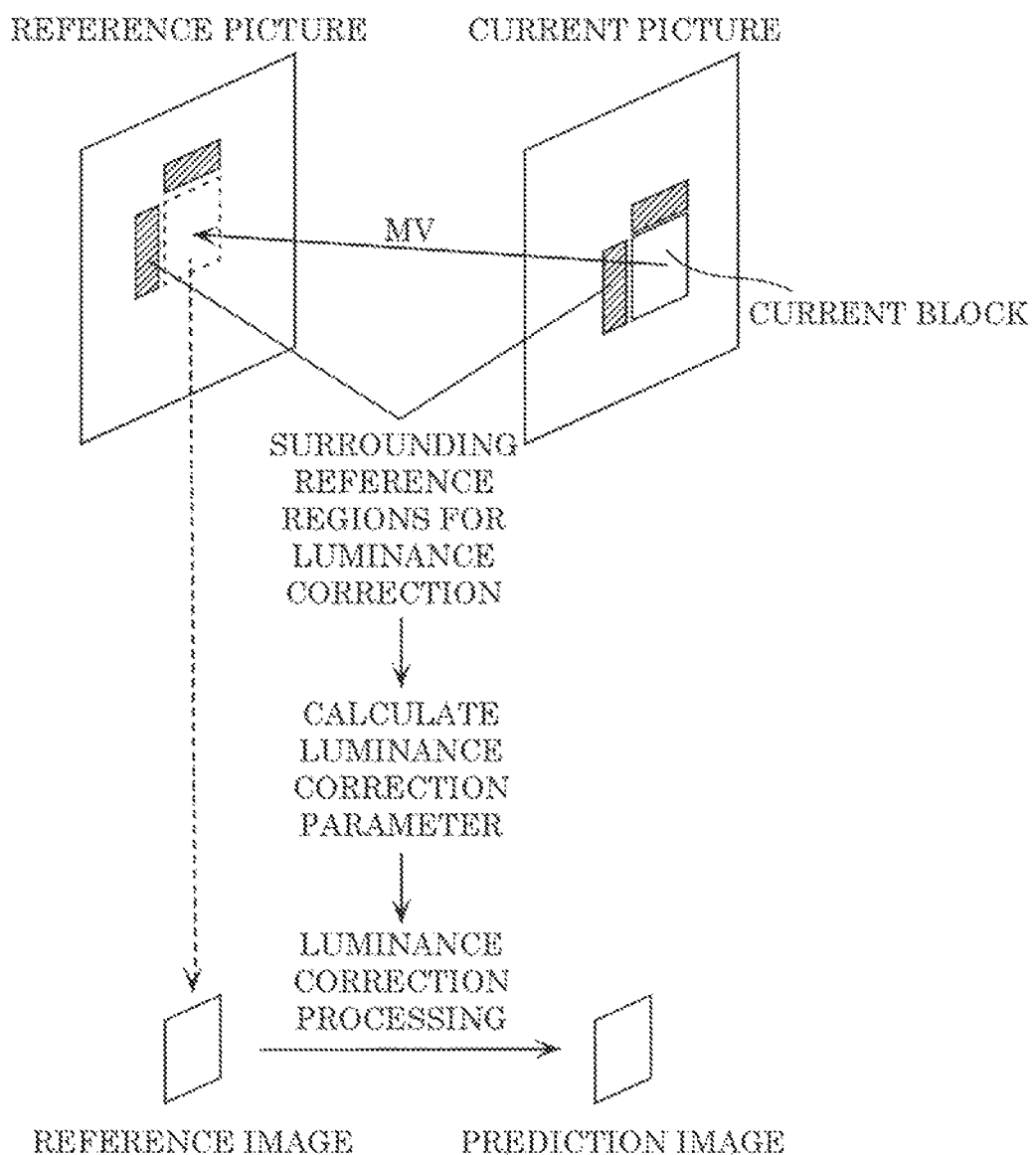
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoding device determines whether the current block belongs to a region of luminance change. The encoding device sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoding device switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoding device side.

[Decoding Device Outline]

Next, a decoding device capable of decoding an encoded signal (encoded bitstream) output from encoding device 100 will be described. FIG. 10 is a block diagram illustrating a functional configuration of decoding device 200 according to Embodiment 1. Decoding device 200 is a moving picture/picture decoding device that decodes a moving picture/picture block by block.

As illustrated in FIG. 10, decoding device 200 includes entropy decoder 202, inverse quantizer 204, inverse transformer 206, adder 208, block memory 210, loop filter 212, frame memory 214, intra predictor 216, inter predictor 218, and prediction controller 220.

Decoding device 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoding device 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoding device 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Transform Basis Determination Processing]

Next, a transform basis determination processing is described. For example, transformer 106 of encoder 100 performs transform of a prediction error, and performs re-transform of the result of the transform. Subsequently, quantizer 108 of encoder 100 performs quantization of the result of the re-transform. The transform of the prediction error is also referred to as primary transform. The inverse transform of the result of the re-transform is also referred to as secondary transform. In other words, transformer 106 performs primary transform of the prediction error, and performs secondary transform of the result of the primary transform.

More specifically, transformer 106 performs the primary transform of the prediction error using a primary transform basis. Subsequently, transformer 106 performs secondary transform of the result of the primary transform using a secondary transform basis. The primary transform basis is a transform basis of primary transform, and the secondary transform basis is a transform basis of secondary transform. For example, the transform basis has a plurality of data patterns. Each data pattern may be referred to as a base. In this case, the transform basis can be regarded as a basis set composed of a plurality of bases.

For example, transformer 106 performs primary transform of a prediction image by deriving, from the prediction image, a component value of each data pattern of the primary transform basis. In other words, the result of the primary transform corresponds to a plurality of component values derived from the prediction image, and corresponds to a plurality of component values corresponding to the data patterns of the primary transform basis.

Subsequently, transformer 106 performs secondary transform of the result of the primary transform by deriving a component value of each data pattern of the secondary transform basis from the result of the primary transform. In other words, the result of the secondary transform corresponds to a plurality of component values derived from the result of the primary transform, and corresponds to a plurality of component values corresponding to the data patterns of the secondary transform basis.

In addition, decoder 200 performs an operation corresponding to the operation performed by encoder 100. More specifically, inverse transformer 206 of decoder 200 performs inverse transform of the result of the inverse quantization, using an inverse secondary transform basis. In addition, inverse transformer 206 performs inverse primary transform of the result of the inverse secondary transform, using an inverse primary transform basis.

Here, the inverse primary transform is transform inverse to primary transform. Inverse transformer 206 performs inverse primary transform using the inverse primary transform basis, so as to derive data that has not been subjected to primary transform from the data already subjected to the primary transform. The inverse primary transform basis is a transform basis that is of inverse primary transform and corresponds to the primary transform basis.

More specifically, inverse transformer 206 may perform inverse primary transform by performing processing according to a procedure opposite to the primary transform, using the inverse primary transform basis corresponding to the primary transform basis.

In addition, the inverse secondary transform is transform inverse to the secondary transform. Inverse transformer 206 performs inverse secondary transform using the inverse secondary transform basis, so as to derive data that has not been subjected to primary transform from the data already subjected to the primary transform. The inverse secondary transform basis is a transform basis that is of inverse secondary transform and corresponds to the secondary transform basis.

More specifically, inverse transformer 206 may perform inverse secondary transform by performing processing according to a procedure opposite to the secondary transform, using the inverse secondary transform basis corresponding to the secondary transform basis.

The result of the inverse quantization in inverse quantizer 206 of decoder 200 corresponds to the result of secondary transform in transformer 106 of encoder 100. In other words, the result of the inverse quantization corresponds to a plurality of component values derived from the result of the primary transform, and corresponds to a plurality of component values corresponding to the data patterns of the secondary transform basis. For example, inverse transformer 206 derives the result of the primary transform by synthesizing these component values using the inverse secondary transform basis when performing the inverse secondary transform of the result of the inverse quantization.

Accordingly, the result of the inverse secondary transform corresponds to the result of the primary transform in transformer 106 of encoder 100. In other words, the result of the inverse secondary transform corresponds to a plurality of component values derived from the prediction image, and corresponds to a plurality of component values corresponding to the data patterns of the primary transform basis. For example, inverse transformer 206 derives a prediction error by synthesizing these component values using the inverse primary transform basis when performing inverse primary transform of the result of the inverse secondary transform.

Transformer 106 according to an embodiment determines a combination of a primary transform basis for use in primary transform and a secondary transform basis for use in secondary transform. For example, transformer 106 applies transform called EMT or AMT to primary transform, and performs primary transform of a prediction error using a primary transform basis determined adaptively. In addition, transformer 106 applies transform called AST, NSST or the like to secondary transform, and performs re-transform of a transform coefficient generated by the primary transform, using a secondary transform basis.

Transformer 106 determines a combination of a primary transform basis and a secondary transform basis in a plurality of primary transform basis candidates and a plurality of secondary transform basis candidates, and performs primary transform and secondary transform using the primary transform basis and the secondary transform basis that make up the determined combination.

Figure 11:
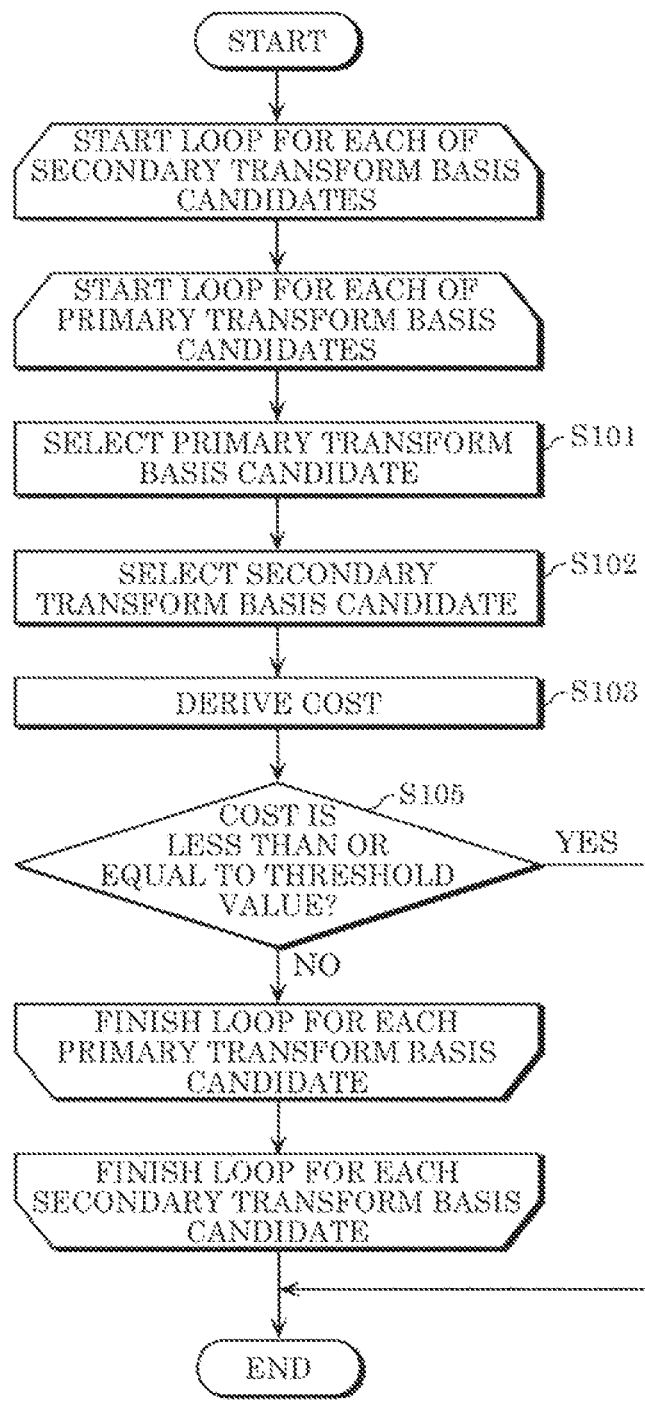
FIG. 11 is a flowchart indicating a first specific example relating to processing for determining transform bases.

FIG. 11 is a flowchart indicating a first specific example relating to processing for determining transform bases. FIG. 11 illustrates an operation for determining a combination of a primary transform basis and a secondary transform basis. For example, transformer 106 of encoder 100 illustrated in FIG. 1 performs an operation illustrated in FIG. 11.

More specifically, in an example of FIG. 11, loop processing for each of the plurality of secondary transform basis candidates includes loop processing for each of the plurality of primary transform basis candidates. Subsequently, in the loop processing, transformer 106 selects a primary transform basis candidate as an evaluation target primary transform basis candidate (S101), and selects a secondary transform basis candidate as an evaluation target secondary transform basis candidate (S102). In other words, transformer 106 selects the combination of a primary transform basis candidate and a secondary transform basis candidate as the evaluation target transform basis candidate.

Subsequently, transformer 106 derives a cost for the combination of the primary transform basis candidate and the secondary transform basis candidate (S103). This cost is, for example, a rate distortion cost (RD), and corresponds to an evaluation value. More specifically, the cost may be based on a coding amount and a difference between an original image and a reconstructed image. Alternatively, the cost may be derived by a zero coefficient, a non-zero coefficient, or the like, based on the primary transform basis candidate and the secondary transform basis candidate. In this embodiment, a less cost is better.

Subsequently, transformer 106 determines whether or not a cost is less than or equal to a threshold value (S105). Here, that a cost is less than or equal to a threshold value corresponds to that a combination of a primary transform basis candidate and a secondary transform basis candidate is appropriate. In addition, that a cost exceeds a threshold value corresponds to that a combination of a primary transform basis candidate and a secondary transform basis candidate is not appropriate.

When a cost is less than or equal to a threshold value (Yes in S105), transformer 106 ends the loop processing. In other words, in this case, transformer 106 ends the selection processing even when a combination that has not been selected and evaluated is left in the plurality of primary transform basis candidates and the plurality of secondary transform basis candidates. Subsequently, transformer 106 determines the primary transform basis candidate and the secondary transform basis candidate making up the combination that yields the cost less than or equal to the threshold value as a final primary transform basis and a final secondary transform basis.

When the cost exceeds the threshold value (No in S105), transformer 106 continues the loop processing. Subsequently, transformer 106 repeats processing until a combination that yields a cost less than or equal to the threshold value is selected or no unselected combination is left. Transformer 106 may determine the primary transform basis candidate and the secondary transform basis candidate making up the combination that yields the least cost as a final primary transform basis and a final secondary transform basis when there is no cost that is less than or equal to the threshold value.

A large amount of processing is required to derive an evaluation value of every combination of a primary transform basis candidate and a secondary transform basis candidate in the plurality of primary transform basis candidates and the plurality of secondary transform basis candidates. In view of this, transformer 106 is capable of reducing increase in the amount of processing by ending the loop processing based on the result of comparison with respect to the threshold value while selecting an appropriate combination of a primary transform basis candidate and a secondary transform basis candidate.

Part of the processing included in the above-described operations may not be performed. For example, one of the primary transform basis candidate and the secondary transform basis candidate may not be selected, or a fixed primary transform basis candidate and a fixed secondary transform basis candidate may be used.

In addition, the plurality of primary transform basis candidates may include a primary transform basis candidate which is not transformed. When a primary transform basis candidate which is not transformed is determined as a primary transform basis, no primary transform is performed. Alternatively, in this case, primary transform that does not change data before and after the secondary transform may be performed. Likewise, the plurality of secondary transform basis candidates may include a secondary transform basis candidate which is not transformed. When a secondary transform basis candidate which is not transformed is determined as a secondary transform basis, no secondary transform is performed. Alternatively, in this case, secondary transform that does not change data before and after the secondary transform may be performed.

Figure 12:
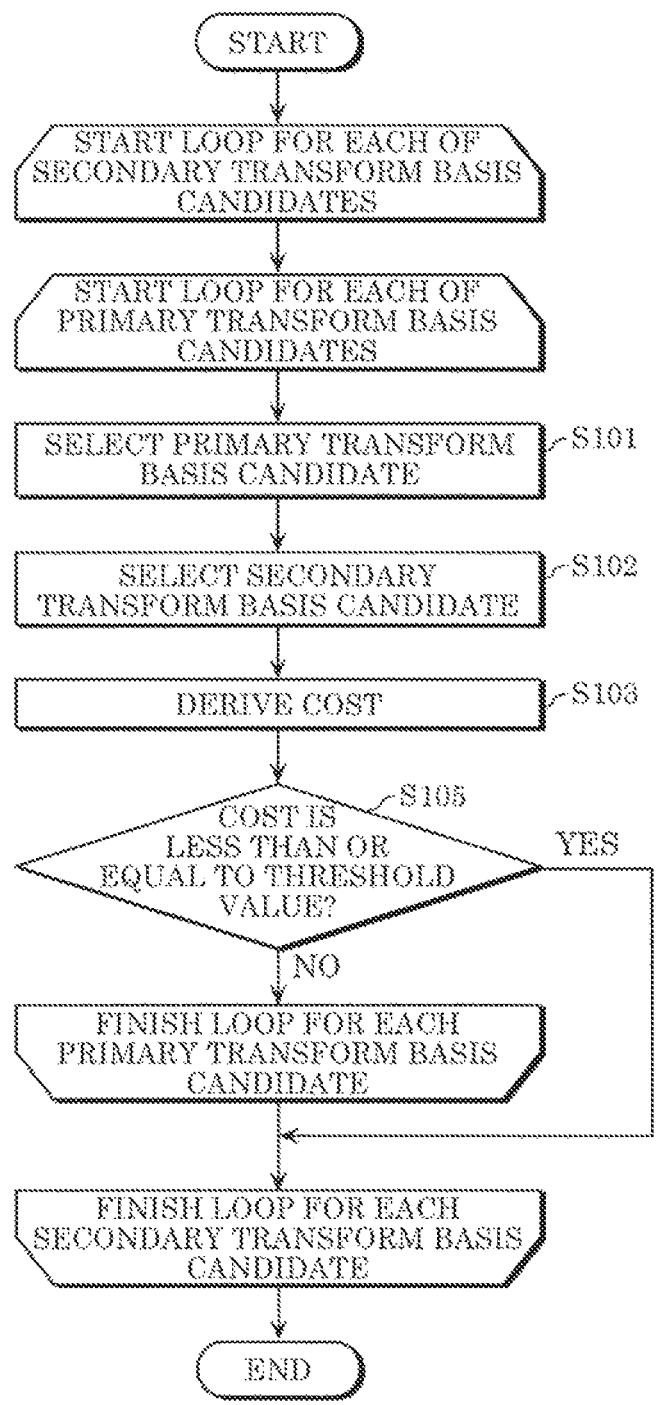
FIG. 12 is a flowchart indicating a second specific example relating to processing for determining transform bases.

FIG. 12 is a flowchart indicating a second specific example relating to a process for determining transform bases. FIG. 12 illustrates an operation for determining a combination of a primary transform basis and a secondary transform basis. For example, transformer 106 of encoder 100 illustrated in FIG. 1 performs the operation illustrated in FIG. 12.

More specifically, in an example of FIG. 12 as in the example of FIG. 11, loop processing for each of the plurality of secondary transform basis candidates includes loop processing for each of the plurality of primary transform basis candidates. Subsequently, in the loop processing, transformer 106 selects a primary transform basis candidate as an evaluation target primary transform basis candidate (S101), and selects a secondary transform basis candidate as an evaluation target secondary transform basis candidate (S102). In other words, transformer 106 selects the combination of a primary transform basis candidate and a secondary transform basis candidate as the evaluation target transform basis candidate.

In addition, as in the example of FIG. 11, transformer 106 derives a cost for the combination of the primary transform basis candidate and the secondary transform basis candidate (S103). Subsequently, transformer 106 determines whether or not a cost is less than or equal to a threshold value (S105).

In the example of FIG. 12, when the cost is less than or equal to the threshold value (Yes in S105), transformer 106 ends the loop processing for each of the plurality of primary transform basis candidates. In other words, in this case, even when there is an unselected primary transform basis candidate for a selected secondary transform basis candidate, transformer 106 does not select the primary transform basis candidate for the selected secondary transform basis candidate.

Subsequently, transformer 106 newly starts loop processing for each of the plurality of primary transform basis candidates in the loop processing for each of the plurality of secondary transform basis candidates. Subsequently, transformer 106 selects a primary transform basis candidate and a secondary transform basis candidate again (S101, S102). For example, the primary transform basis candidate to be selected at this time is a primary transform basis candidate unselected for the secondary transform basis candidate selected at this time, and the secondary transform basis candidate to be selected at this time is an unselected secondary transform basis candidate.

When the cost exceeds the threshold value (No in S105), transformer 106 continues loop processing for each of the plurality of primary transform basis candidates. Subsequently, transformer 106 selects a primary transform basis candidate and a secondary transform basis candidate again (S101, S102). For example, the primary transform basis candidate to be selected at this time is a primary transform basis candidate unselected for the secondary transform basis candidate selected at this time, and the secondary transform basis candidate to be selected at this time is the secondary transform basis candidate selected just before this time.

Subsequently, transformer 106 performs the above-described processing (S101 to S103, and S105) by repeating loop processing for each of the plurality of primary transform basis candidates until the loop processing for each of the plurality of secondary transform basis candidates ends. Subsequently, transformer 106 determines the primary transform basis candidate and the secondary transform basis candidate making up the combination that yields the least cost out of the combinations whose costs have been derived, as a final primary transform basis and a final secondary transform basis.

In the example of FIG. 12, transformer 106 derives costs for a larger number of combinations than in the example of FIG. 11. Accordingly, transformer 106 is capable of selecting a more appropriate combination.

For example, transformer 106 may select each of a plurality of primary transform basis candidates in priority order. For example, transformer 106 may select each of the plurality of primary transform basis candidates in an ascending order of priority. In this way, transformer 106 is capable of deriving a cost for a combination of a priority transform basis candidate having a high priority rank and each of the plurality of secondary transform basis candidates without skipping the combination.

In addition, here, loop processing for each of the plurality of secondary transform basis candidates includes loop processing for each of the plurality of primary transform basis candidates. However, the loop processing for each of the plurality of primary transform basis candidates may include loop processing for each of the plurality of secondary transform basis candidates. Subsequently, when the cost is less than or equal to the threshold value, transformer 106 may end the loop processing for each of the plurality of secondary transform basis candidates. In other words, the relationship between a primary transform basis candidate and a secondary transform basis candidate may be inversed.

Figure 13:
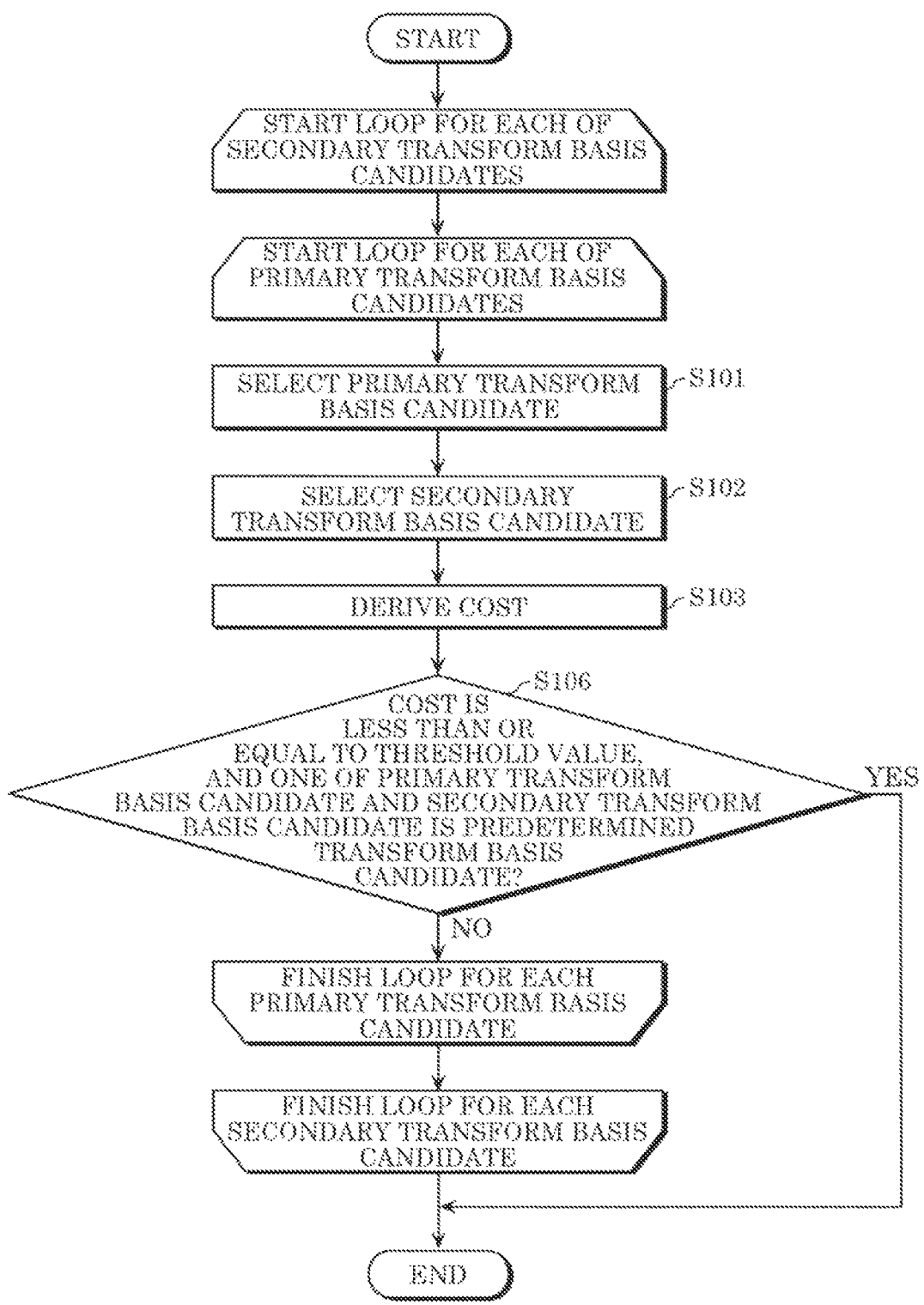
FIG. 13 is a flowchart indicating a third specific example relating to processing for determining transform bases.

FIG. 13 is a flowchart indicating a third specific example relating to processing for determining transform bases. FIG. 13 illustrates an operation for determining a combination of a primary transform basis and a secondary transform basis.

For example, transformer 106 of encoder 100 illustrated in FIG. 1 performs the operation illustrated in FIG. 13.

More specifically, in an example of FIG. 13 as in the example of FIG. 11, loop processing for each of the plurality of secondary transform basis candidates includes loop processing for each of the plurality of primary transform basis candidates. Subsequently, in the loop processing, transformer 106 selects a primary transform basis candidate as an evaluation target primary transform basis candidate (S101), and selects a secondary transform basis candidate as an evaluation target secondary transform basis candidate (S102). In other words, transformer 106 selects the combination of a primary transform basis candidate and a secondary transform basis candidate as the evaluation target transform basis candidate.

In addition, as in the example of FIG. 11, transformer 106 derives a cost for the combination of the primary transform basis candidate and the secondary transform basis candidate (S103). Subsequently, in the example of FIG. 13, transformer 106 determines whether the cost is less than or equal to the threshold value and whether or not one of the primary transform basis candidate and the secondary transform basis candidate is a predetermined transform basis candidate (S106).

When the determination conditions are satisfied (Yes in S106), transformer 106 ends the loop processing. In other words, in this case, transformer 106 ends the selection processing even when a combination that has not been selected and evaluated is left in the plurality of primary transform basis candidates and the plurality of secondary transform basis candidates. When the determination conditions are not satisfied (No in S106), transformer 106 ends the loop processing. Here, transformer 106 repeats the processing until the determination conditions are satisfied or no unselected combination is left.

Subsequently, transformer 106 determines the primary transform basis candidate and the secondary transform basis candidate making up the combination that yields the least cost out of the combinations whose costs have been derived, as a final primary transform basis and a final secondary transform basis. Transformer 106 may determine the primary transform basis candidate and the secondary transform basis candidate making up the combination that satisfies the determination conditions as a final primary transform basis and a final secondary transform basis.

In the example of FIG. 13, transformer 106 derives costs for a larger number of combinations than in the example of FIG. 11. Accordingly, transformer 106 is capable of selecting a more appropriate combination.

In addition, whether or not the one of the primary transform basis candidate and the secondary transform basis candidate is the predetermined transform basis candidate may be whether or not the primary transform basis candidate is the predetermined transform basis candidate and whether or not the secondary transform basis candidate is the predetermined transform basis candidate. For example, the predetermined transform basis candidate may be a transform basis corresponding to DCT 2. Transformer 106 may end loop processing only when a cost is less than or equal to a threshold value and a first transform basis candidate is a transform basis corresponding to DCT 2.

In addition, a plurality of predetermined transform basis candidates may be used. In other words, whether or not one of the primary transform basis candidate and the secondary transform basis candidate is the predetermined transform basis candidate may be whether or not the one of the primary transform basis candidate and the secondary transform basis candidate is included in a plurality of predetermined transform basis candidates.

Figure 14:
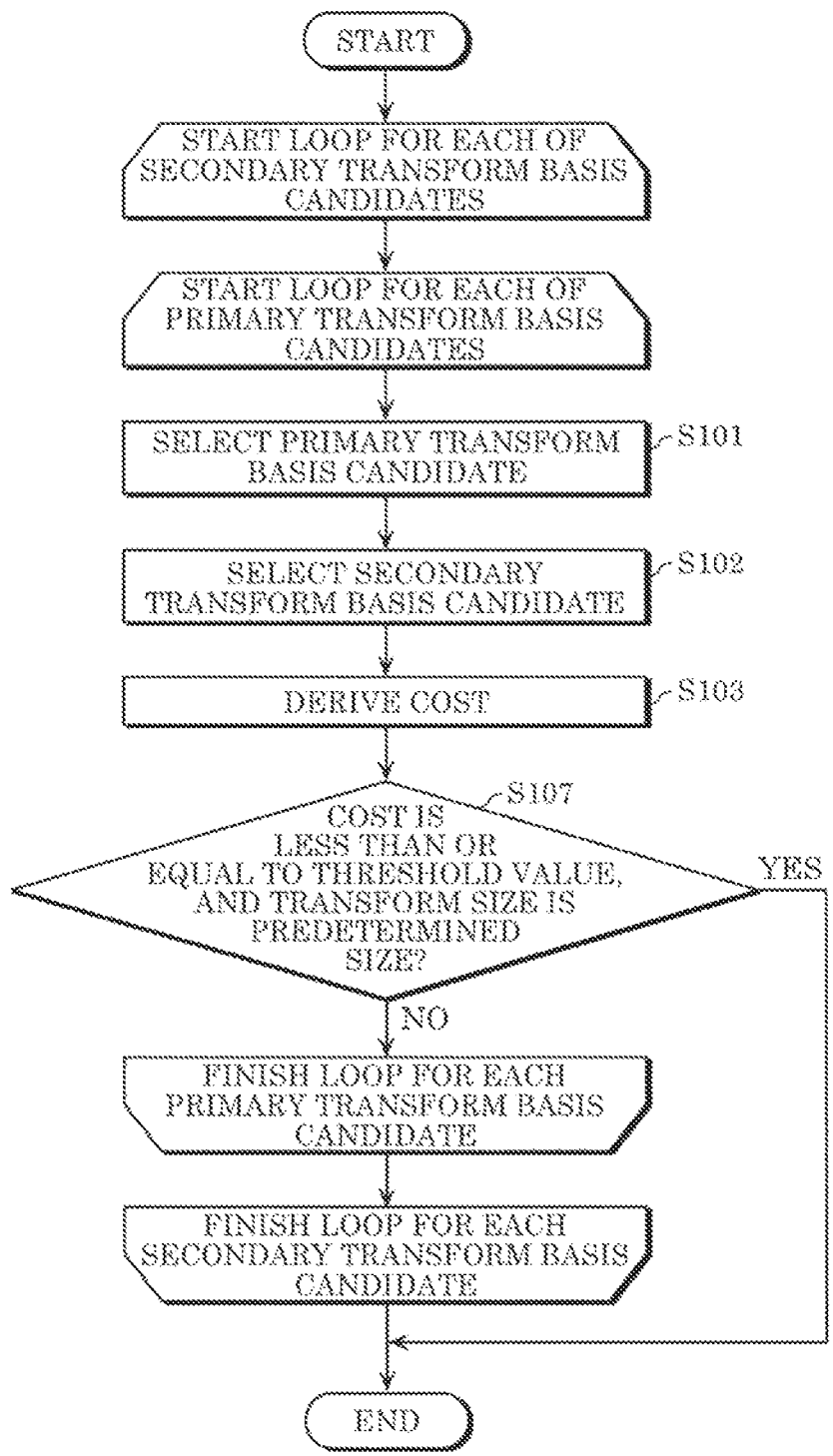
FIG. 14 is a flowchart indicating a fourth specific example relating to processing for determining transform bases.

FIG. 14 is a flowchart indicating a fourth specific example relating to processing for determining transform bases. FIG. 14 illustrates an operation for determining a combination of a primary transform basis and a secondary transform basis. For example, transformer 106 of encoder 100 illustrated in FIG. 1 performs the operation illustrated in FIG. 14.

More specifically, in an example of FIG. 14 as in the example of FIG. 11, loop processing for each of the plurality of secondary transform basis candidates includes loop processing for each of the plurality of primary transform basis candidates. Subsequently, in the loop processing, transformer 106 selects a primary transform basis candidate as an evaluation target primary transform basis candidate (S101), and selects a secondary transform basis candidate as an evaluation target secondary transform basis candidate (S102). In other words, transformer 106 selects the combination of a primary transform basis candidate and a secondary transform basis candidate as the evaluation target transform basis candidate.

In addition, as in the example of FIG. 11, transformer 106 derives a cost for the combination of the primary transform basis candidate and the secondary transform basis candidate (S103). Subsequently, in the example of FIG. 14, transformer 106 determines whether or not a cost is less than or equal to a threshold value (S107). Here, the transform size corresponds to a size of a block that is transformed through one of a single primary transform process and a single secondary transform process.

When the determination conditions are satisfied (Yes in S107), transformer 106 ends the loop processing. In other words, in this case, transformer 106 ends the selection processing even when a combination that has not been selected and evaluated is left in the plurality of primary transform basis candidates and the plurality of secondary transform basis candidates. When the determination conditions are not satisfied (No in S107), transformer 106 continues the loop processing. Here, transformer 106 repeats the processing until the determination conditions are satisfied or no unselected combination is left.

Subsequently, transformer 106 determines the primary transform basis candidate and the secondary transform basis candidate making up the combination that yields the least cost out of the combinations whose costs have been derived, as a final primary transform basis and a final secondary transform basis. Transformer 106 may determine the primary transform basis candidate and the secondary transform basis candidate making up the combination that satisfies the determination conditions as a final primary transform basis and a final secondary transform basis.

In the example of FIG. 14, transformer 106 derives costs for a larger number of combinations than in the example of FIG. 11. Accordingly, transformer 106 is capable of selecting a more appropriate combination.

In addition, a plurality of predetermined sizes may be used. In other words, whether or not the transform size is the predetermined size may be whether or not the transform size is one of the plurality of predetermined sizes. In addition, the predetermined size may correspond to a size range.

For example, transformer 106 may end loop processing only when a cost is less than or equal to a threshold value and a transform size is 4×4. In addition, for example, transformer 106 may end loop processing only when a cost is less than or equal to a threshold value and a transform size is 8×8.

Figure 15:
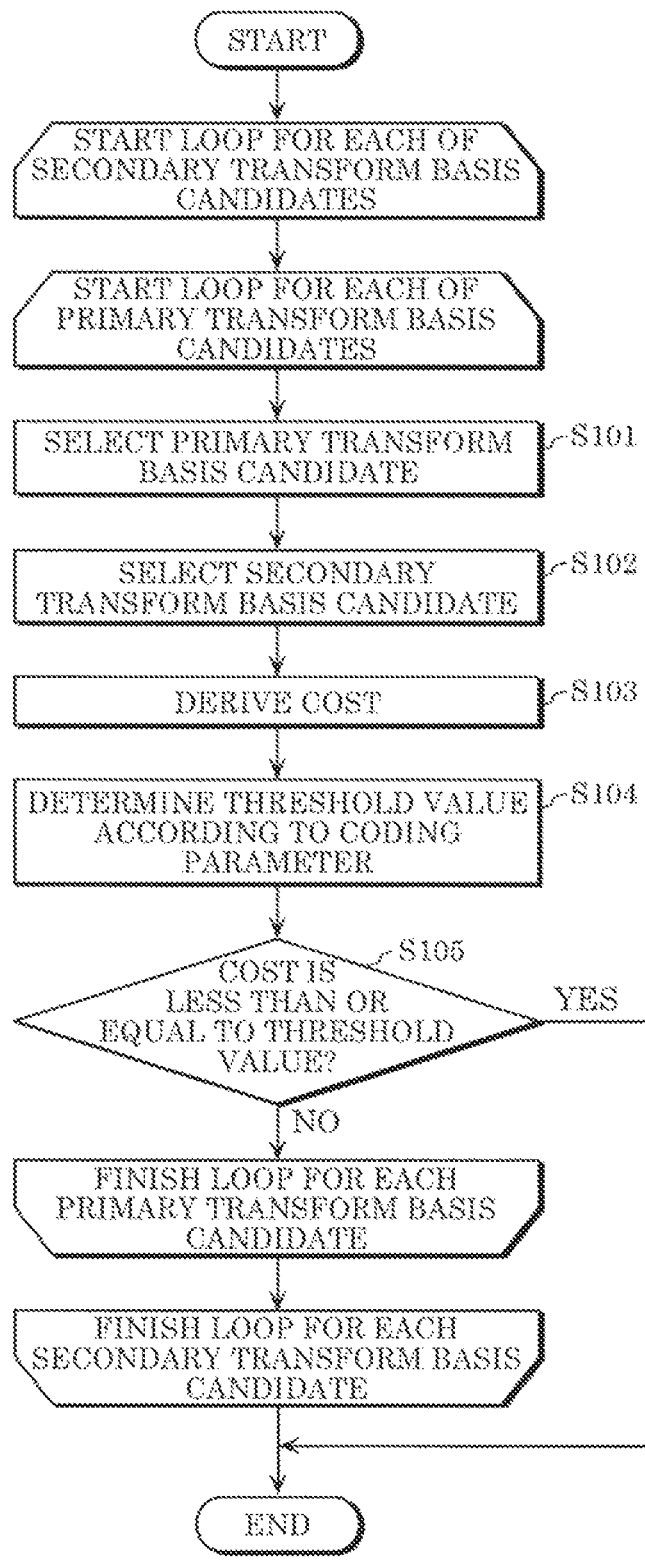
FIG. 15 is a flowchart indicating a fifth specific example relating to processing for determining transform bases.

FIG. 15 is a flowchart indicating a fifth specific example relating to processing for determining transform bases. FIG. 15 illustrates an operation for determining a combination of a primary transform basis and a secondary transform basis. For example, transformer 106 of encoder 100 illustrated in FIG. 1 performs the operation illustrated in FIG. 15.

More specifically, in an example of FIG. 15 as in the example of FIG. 11, loop processing for each of the plurality of secondary transform basis candidates includes loop processing for each of the plurality of primary transform basis candidates. Subsequently, in the loop processing, transformer 106 selects a primary transform basis candidate as an evaluation target primary transform basis candidate (S101), and selects a secondary transform basis candidate as an evaluation target secondary transform basis candidate (S102). In other words, transformer 106 selects the combination of a primary transform basis candidate and a secondary transform basis candidate as the evaluation target transform basis candidate.

In addition, as in the example of FIG. 11, transformer 106 derives a cost for the combination of the primary transform basis candidate and the secondary transform basis candidate (S103). Subsequently, in the example of FIG. 15, transformer 106 adaptively determines a threshold value based on a coding parameter (S104). Here, coding parameter is a parameter to be coded, and may be specifically a primary transform basis, a secondary transform basis, a block size, a quantization parameter, or the like. For example, a threshold value when a primary transform basis corresponds to DCT 2 and a threshold value when a primary transform basis corresponds to DST 7 may vary.

Subsequently, transformer 106 determines whether or not a cost is less than or equal to a threshold value (S105), using a determined threshold value.

When a cost is less than or equal to a threshold value (Yes in S105), transformer 106 ends the loop processing. In other words, in this case, transformer 106 ends the selection processing even when a combination that has not been selected and evaluated in the plurality of primary transform basis candidates and the plurality of secondary transform basis candidates. Subsequently, transformer 106 determines the primary transform basis candidate and the secondary transform basis candidate making up the combination that yields the cost less than or equal to the threshold value as a final primary transform basis and a secondary transform basis.

When the cost is not less than or equal to the threshold value (No in S105), transformer 106 continues the loop processing. Here, subsequently, transformer 106 repeats processing until a combination that yields a cost less than or equal to the threshold value is selected or no unselected combination is left. When repeating the processing until no unselected combination is left, transformer 106 may determine the primary transform basis candidate and the secondary transform basis candidate making up the combination that yields the least cost as a final primary transform basis and a final secondary transform basis.

Through the operation, transformer 106 is capable of adaptively determining the threshold value to be used to determine whether or not the cost is less than or equal to the threshold value, based on the coding parameter.

For example, a cost frequency distribution when a quantization parameter is 22 and a cost frequency distribution when a quantization parameter is 37 may vary significantly. When the same threshold value is used in these cases, the following events occur: a cost is highly likely to exceed the threshold value in one of the cases and a cost is highly likely to be less than the threshold value in the other case. In these events, reduction in increase in the amount of processing and appropriate determination of transform bases may not be performed in a balanced manner.

In the example of FIG. 15, transformer 106 is capable of reducing increase in the amount of processing and appropriately determining transform bases in a balanced manner by adaptively determining a threshold value based on a coding parameter.

The examples in FIGS. 11 to 15 may be arbitrarily combined. For example, in the examples of FIGS. 13 to 15, as in the example of FIG. 12, only one of loop processing for each of primary transform basis candidates and loop processing for each of secondary transform basis candidates may be ended.

In addition, in the examples of FIGS. 11 to 15, a threshold value for a cost of a transform basis candidate may be determined as an absolute threshold value that is independent of a cost, etc., of another transform basis candidate, or may be determined as a threshold value relative to a cost, etc., of another transform basis candidate. In particular, in the example of FIG. 15, the relative threshold value determined by the cost of the other transform basis candidate may be adjusted by a coding parameter.

Although the examples of FIGS. 11 to 15 have been described as configurations in each of which transformer 106 ends both or one of the loop processing for each primary transform basis candidate and the loop processing for each secondary transform basis candidate when determination conditions are satisfied, any of the configurations may be replaced by the following alternative configuration for continuing the loop processing by skipping only one or more particular candidates out of a plurality of primary transform basis candidates that have not been evaluated and a plurality of secondary transform basis candidates that have not been evaluated, instead of ending the loop processing by skipping evaluation for each of a plurality of primary transform basis candidates that have not been evaluated and each of a plurality of secondary transform basis candidates that have not been evaluated.

As for the relative threshold value, for example, a threshold value may be determined based on a representative cost before loop processing. More specifically, a cost for a combination of a primary transform basis candidate corresponding to DCT 2 and a secondary transform basis that is not transformed may be determined as a reference cost. A value, etc., obtainable by multiplying the reference cost by a constant may be determined as a relative threshold value.

Alternatively, a cost of a representative combination of a primary transform basis candidate and a secondary transform basis candidate may be derived at the beginning of loop processing, and then the cost of the representative combination may be used as a threshold value. For example, a cost of a combination of a primary transform basis candidate corresponding to DCT 2 and a secondary transform basis that is not transformed may be derived at the beginning of loop processing. Subsequently, the cost of the combination may be used as a threshold value.

Alternatively, priority ranks may be determined in advance for the plurality of combinations each composed of a primary transform basis candidate and a secondary transform basis candidate. Subsequently, transformer 106 may select each of the combinations in a priority order (that is, in an ascending order of priority) in loop processing. Subsequently, transformer 106 may determine whether or not the cost of each combination is less than or equal to the cost of a previous combination in the priority order. In other words, the cost of the combination ranked higher than a current combination in the priority order may be used as a threshold value.

Here, the combination ranked higher in the priority order may be the combination ranked directly above a current combination in the priority order or any of the plurality of combinations ranked higher than a current combination in the priority order.

In addition, in the above explanation, transformer 106 skips the selection when the cost is less than or equal to the threshold value, and does not skip the selection when the cost exceeds the threshold value. However, transformer 106 may not skip selection when the cost is less than the threshold value and may skip selection when the cost exceeds the threshold value.

For example, priority ranks may be determined in advance for the plurality of combinations each composed of a primary transform basis candidate and a secondary transform basis candidate. Subsequently, transformer 106 may select each of the combinations in a priority order in loop processing. Subsequently, when the cost of the combination exceeds the cost of a combination ranked above, transformer 106 may end the loop processing. In this case, the primary transform basis candidate and the secondary transform basis candidate making up the combination ranked above may be determined as a primary transform basis and a secondary transform basis.

In the above example, the threshold value is the cost of the combination ranked above. When the cost of the combination exceeds the threshold value, transformer 106 skips the selection of the combination by ending the loop processing.

Here, a cost that is desired to be less is used as an evaluation value. The evaluation value is not limited to such a cost, and may be a value that is desired to be larger. In addition, in each of FIGS. 11 to 15, whether or not the cost to be used as an evaluation value is less than or equal to a threshold value is used as a determination condition. However, whether or not an evaluation value exceeds a threshold value may be used as a determination condition, or whether or not an evaluation value is less than a threshold value may be used as a determination condition.

In addition, the processing for ending a loop based on a determination result may be validated or invalidated on a per slice basis. Alternatively, the processing for ending a loop based on a determination result may be validated or invalidated on a per tile basis. Alternatively, the processing for ending a loop based on a determination result may be validated or invalidated on a per CTU basis. Alternatively, the processing for ending a loop based on a determination result may be validated or invalidated on a per CU basis.

In addition, the processing for ending a loop based on a determination result may be validated or invalidated according to a frame type such as an I-frame, a P-frame, and a B-frame. In addition, the processing for ending a loop based on a determination result may be validated or invalidated according to a prediction mode such as intra prediction and inter prediction.

In addition, when the transform is separable into vertical transform and horizontal transform, the processing for ending a loop based on a determination result may be validated or invalidated independently of the vertical or horizontal direction. For example, processing for ending a loop based on a determination result may be performed in one of the vertical and horizontal directions, and processing for ending a loop based on a determination result may not be performed in the other one of the vertical and horizontal directions. Alternatively, processing for ending a loop based on a determination result may be performed in each of the vertical and horizontal directions.

In addition, processing for ending a loop based on a determination result may be validated or invalidated according to one of luminance and chrominance. For example, processing for ending a loop based on a determination result may be performed on one of luminance and chrominance, and processing for ending a loop based on a determination result may not be performed on the other one of luminance and chrominance. Alternatively, processing for ending a loop based on a determination result may be performed on each of luminance and chrominance.

[Implementation Example of Encoder]

Figure 16:
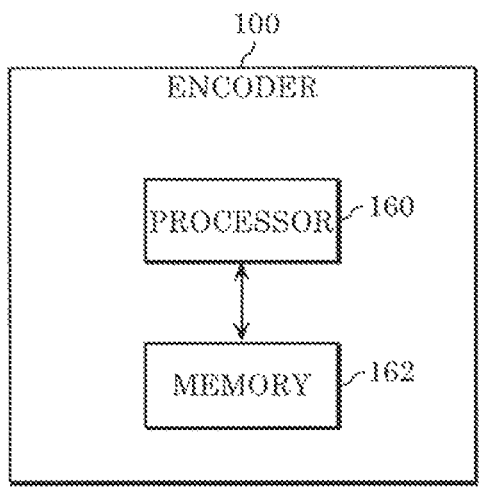
FIG. 16 is a block diagram indicating an implementation example of an encoder according to Embodiment 1.

FIG. 16 is a block diagram indicating an implementation example of encoder 100 according to Embodiment 1. Encoder 100 includes processor 160 and memory 162. For example, a plurality of constituent elements of encoder 100 illustrated in FIG. 1 are implemented as processor 160 and memory 162 illustrated in FIG. 16.

Processor 160 is an electronic circuit accessible to memory 162, and performs information processing. For example, processor 160 is an exclusive or general processor which codes a moving picture using memory 162. Processor 160 may be a CPU.

In addition, processor 160 may be configured with a plurality of electronic circuits, or may be configured with a plurality of sub-processors. In addition, processor 160 may take the roles of two or more constituent elements other than a constituent element for storing information out of the plurality of constituent elements of encoder 100 illustrated in FIG. 1.

Memory 162 is an exclusive or general memory for storing information that is used by processor 160 to code a moving picture. Memory 162 may be an electronic circuit, may be connected to processor 160, or may be included in processor 160.

In addition, memory 162 may be configured with a plurality of electronic circuits, or may be configured with a plurality of sub-memories. In addition, memory 162 may be a magnetic disc or an optical disc, or the like, or may be represented as a storage, a recording medium, or the like. In addition, memory 162 may be a non-volatile memory or a volatile memory.

For example, processor 162 may take the role of a constituent element for storing information out of the plurality of constituent elements of encoder 100 illustrated in FIG. 1. More specifically, memory 162 may take the roles of block memory 118 and frame memory 122 illustrated in FIG. 1.

In addition, memory 162 may store a moving picture to be coded or a bitstream corresponding to the moving picture to be coded. In addition, memory 162 may store a program for causing processor 160 to code a moving picture. In addition, memory 162 may store, for example, information indicating a plurality of transform basis candidates.

In addition, in encoder 100, all of the plurality of constituent elements illustrated in FIG. 1 may not be implemented, and all of the processes described above may not be performed. Part of the constituent elements illustrated in FIG. 1 may be included in another device, or part of the processes described above may be performed by another device. In this case, the part of the constituent elements illustrated in FIG. 1 are implemented in encoder 100, and the part of the processes described above may be performed by encoder 100, which reduces increase in the amount of processing and enables appropriate determination of transform bases.

As described above, processor 160 of encoder 100 illustrated in FIG. 16 codes a moving picture using memory 162 of encoder 100.

For example, processor 160 subtracts a prediction image of an image included in the moving picture from the image so as to derive a prediction error of the image. In addition, processor 160 sequentially selects a plurality of transform basis candidates for a transform basis to be used to perform transform of the prediction error. Subsequently, processor 160 derives an evaluation value of a transform basis candidate selected out of the plurality of transform basis candidates, and compares the evaluation value with a threshold value.

Based on the result of the comparison, processor 160 skips selection of one or more transform basis candidates that have not been selected out of the plurality of transform basis candidates. Subsequently, processor 160 determines the transform basis from one or more transform basis candidates selected out of the plurality of transform basis candidates. Processor 160 performs the transform of the prediction error, using the transform basis. Subsequently, processor 160 quantizes the result of the transform. Subsequently, processor 160 codes the result of the quantization as data of the image.

In addition, for example, the transform may include primary transform and secondary transform. In addition, the transform basis may be a combination of a primary transform basis that is a transform basis for use in the primary transform and a secondary transform basis that is a transform basis for use in the secondary transform. In addition, each of the plurality of transform basis candidates may be a combination of one of a plurality of primary transform basis candidates for the primary transform basis and one of a plurality of secondary transform basis candidates for the secondary transform basis.

In addition, for example, processor 160 may sequentially select the plurality of transform basis candidates by sequentially selecting the plurality of primary transform basis candidates and sequentially selecting the plurality of secondary transform basis candidates.

Based on the result of the comparison, processor 160 may end the sequential selection of the plurality of primary transform basis candidates and end the sequential selection of the plurality of secondary transform basis candidates. In this way, processor 160 may skip the selection of the one or more transform basis candidates that have not been selected out of the plurality of transform basis candidates.

In addition, for example, processor 160 may sequentially select the plurality of transform basis candidates by sequentially selecting the plurality of primary transform basis candidates and sequentially selecting the plurality of secondary transform basis candidates.

Based on the result of the comparison, processor 160 may skip one of selection of one or more primary transform basis candidates that have not been selected and selection of one or more secondary transform basis candidates that have not been selected. In this way, processor 160 may skip the selection of the one or more transform basis candidates that have not been selected out of the plurality of transform basis candidates.

In addition, for example, when the result of the comparison shows that the evaluation value is better than the threshold value, the processor may skip the selection of the one or more transform basis candidates that have not been selected. Processor 160 may the processor may determine the threshold value using an evaluation value of another transform basis candidate selected before the transform basis candidate selected. In addition, for example, processor 160 may determine the threshold value using a parameter to be coded when coding the moving picture.

In addition, for example, when the transform basis candidate selected is a predetermined transform basis candidate, processor 160 may skip the selection of the one or more transform basis candidates that have not been selected out of the plurality of transform basis candidates, based on the result of the comparison. In addition, for example, when a size of the transform is a predetermined size, processor 160 may skip the selection of the one or more transform basis candidates that have not been selected out of the plurality of transform basis candidates, based on the result of the comparison.

In addition, for example, processor 160 may code information indicating the transform basis that is determined based on the result of the comparison.

It is to be noted that encoder 100 is not limited to the above implementation example, and may include subtractor 104, transformer 106, quantizer 108, and entropy encoder 110. These constituent elements may perform the above-described operations.

For example, subtractor 104 may subtract a prediction image of an image included in the moving picture from the image so as to derive a prediction error of the image. In addition, transformer 106 may sequentially select a plurality of transform basis candidates for a transform basis to be used to perform transform of the prediction error. Subsequently, transformer 106 may derive an evaluation value of a transform basis candidate selected out of the plurality of transform basis candidates, and compare the evaluation value with a threshold value.

Based on the result of the comparison, transformer 106 may skip selection of one or more transform basis candidates that have not been selected out of the plurality of transform basis candidates. Subsequently, transformer 106 may determine the transform basis from one or more transform basis candidates selected out of the plurality of transform basis candidates. Subsequently, transformer 106 may perform the transform of the prediction error, using the transform basis. In addition, quantizer 108 may quantize the result of the transform. In addition, entropy encoder 110 may code the result of the quantization as data of the image.

Furthermore, transformer 106 may perform another operation related to transform, and entropy encoder 110 may perform another operation related to coding. In addition, transformer 106 may be separated into a transform base determiner which determines a primary transform basis and a secondary transform basis, a primary transformer which performs primary transform, and a secondary transformer which performs secondary transform.

[Implementation Example of Decoder]

Figure 17:
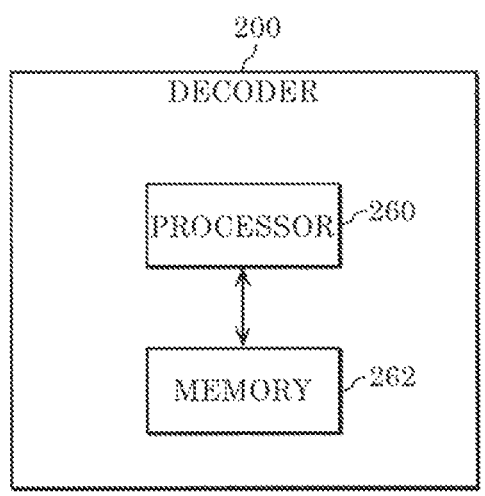
FIG. 17 is a block diagram indicating an implementation example of a decoder according to Embodiment 1.

FIG. 17 is a block diagram indicating an implementation example of decoder 200 according to Embodiment 1. Decoder 200 includes processor 260 and memory 262. For example, a plurality of constituent elements of decoder 200 illustrated in FIG. 10 are implemented as processor 260 and memory 262 illustrated in FIG. 17.

Processor 260 is an electronic circuit accessible to memory 262, and performs information processing. For example, processor 260 is an exclusive or general processor which decodes a moving picture using memory 262. Processor 260 may be a CPU.

In addition, processor 260 may be configured with a plurality of electronic circuits, or may be configured with a plurality of sub-processors. In addition, processor 260 may take the roles of two or more constituent elements other than a constituent element for storing information out of the plurality of constituent elements of decoder 200 illustrated in FIG. 10.

Memory 262 is an exclusive or general memory for storing information that is used by processor 260 to decode a moving picture. Memory 262 may be an electronic circuit, may be connected to processor 260, or may be included in processor 260.

In addition, memory 262 may be configured with a plurality of electronic circuits, or may be configured with a plurality of sub-memories. In addition, memory 262 may be a magnetic disc or an optical disc, or the like, or may be represented as a storage, a recording medium, or the like. In addition, memory 262 may be a non-volatile memory or a volatile memory.

For example, memory 262 may take the role of a constituent element for storing information out of the plurality of constituent elements of decoder 200 illustrated in FIG. 10. More specifically, memory 262 may take the roles of block memory 210 and frame memory 214 illustrated in FIG. 10.

In addition, memory 262 may store a bitstream corresponding to the moving picture coded or a moving picture corresponding to the bitstream decoded. In addition, memory 262 may store a program for causing processor 260 to decode a moving picture. In addition, memory 262 may store, for example, information indicating a plurality of transform basis candidates.

In addition, in decoder 200, all of the plurality of constituent elements illustrated in FIG. 10 may not be implemented, and all of the processes described above may not be performed. Some of the constituent elements illustrated in FIG. 10 may be included in another device, or some of the processes described above may be performed by another device. In this case, the part of the constituent elements illustrated in FIG. 10 are implemented in decoder 200, and the part of the processes described above may be performed by decoder 200, which reduces increase in the amount of processing and enables appropriate determination of transform bases.

As described above, processor 260 of decoder 200 illustrated in FIG. 17 decodes a moving picture using memory 262 of decoder 200.

For example, processor 260 decodes data of an image included in the moving picture. In addition, processor 260 decodes information indicating a transform basis determined based on the result of comparison between an evaluation value of a transform basis candidate and a threshold value. In addition, processor 260 performs inverse quantization of the data decoded. In addition, processor 260 performs inverse transform of the result of the inverse quantization, using the transform basis indicated by the information decoded. In addition, processor 260 derives the image by adding, as a prediction error of the image, the result of the inverse transform to a prediction image of the image.

It is to be noted that decoder 200 is not limited to the above-described implementation, and may include entropy decoder 202, inverse quantizer 204, inverse transformer 206, and adder 208. These constituent elements may perform the above-described operations.

For example, entropy decoder 202 may decode data of an image included in the moving picture. In addition, entropy decoder 202 may decode information indicating a transform basis determined based on the result of comparison between an evaluation value of a transform basis candidate and a threshold value. In addition, inverse quantizer 204 may perform inverse quantization of the data decoded.

In addition, inverse transformer 206 may perform inverse transform of the result of the inverse quantization, using the transform basis indicated by the information decoded. In addition, adder 208 may derive the image by adding, as a prediction error of the image, the result of the inverse transform to a prediction image of the image.

Furthermore, inverse transformer 206 may perform other operations related to the transform, or entropy decoder 202 may perform other operations related to the decoding. In addition, inverse transformer 206 may be separated into a transform basis determiner which determines an inverse primary transform basis and an inverse secondary transform basis, an inverse primary transformer which transforms inverse primary transform, and an inverse secondary transformer which transforms inverse secondary transform.

[Supplement]

Encoder 100 and decoder 200 according to this embodiment may be used as an image encoder and an image decoder, or may be used as a moving picture encoder and a moving picture decoder. Alternatively, each of encoder 100 and decoder 200 can be used as a transformer.

In other words, each of encoder 100 and decoder 200 may correspond to only one of transformer 106 and inverse transformer 206. Subsequently, inter predictors 126 and 218 and other constituent elements may be included in other devices.

In addition, at least part of this embodiment may be used as a coding method, a decoding method, a transforming method, or other methods.

In addition, in this embodiment, each of the constituent elements may be configured with exclusive hardware, or may be implemented by executing a software program suitable for each constituent element. Each constituent element may be implemented by means of a program executer such as a CPU and a processor reading and executing a software program stored in a recording medium such as a hard disc or a semiconductor memory.

More specifically, each of encoder 100 and decoder 200 may include processing circuitry and storage electrically connected to the processing circuitry and accessible from the processing circuitry. For example, the processing circuitry corresponds to one of processors 160 and 260, and the storage corresponds to one of memories 162 and 262.

The processing circuitry includes at least one of the exclusive hardware and the program executer. In addition, when the processing circuitry includes the program executer, the storage stores a software program that is executed by the program executer.

Here, the software which implements encoder 100, decoder 200, etc., according to this embodiment includes programs as indicated below.

In other words, the program may cause a computer to execute such a coding method for coding a moving picture that includes: subtracting a prediction image of an image included in the moving picture from the image so as to derive a prediction error of the image; sequentially selecting a plurality of transform basis candidates for a transform basis to be used to perform transform of the prediction error; deriving an evaluation value of a transform basis candidate selected out of the plurality of transform basis candidates; comparing the evaluation value with a threshold value; based on the result of the comparison, skipping selection of one or more transform basis candidates that have not been selected out of the plurality of transform basis candidates; determining the transform basis from one or more transform basis candidates selected out of the plurality of transform basis candidates; performing the transform of the prediction error, using the transform basis; quantizing the result of the transform; and coding the result of the quantization as data of the image.

Alternatively, the program may cause such a decoding method for decoding a moving picture that includes: decoding data of an image included in the moving picture; decoding information indicating a transform basis determined based on the result of comparison between an evaluation value of a transform basis candidate and a threshold value; performing inverse quantization of the data decoded; performing inverse transform of the result of the inverse quantization, using the transform basis indicated by the information decoded; and deriving the image by adding, as a prediction error of the image, the result of the inverse transform to a prediction image of the image.

In addition, each constituent element may be circuitry as described above. Circuits may compose circuitry as a whole, or may be separate circuits. Alternatively, each constituent element may be implemented as a general processor, or may be implemented as an exclusive processor.

In addition, the processing that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanation may be arbitrarily changed. A new ordinal number may be attached to a constituent element, or an ordinal number attached to a constituent element may be removed.

Although some aspects of encoder 100 and decoder 200 have been explained based on the above embodiments, aspects of encoder 100 and decoder 200 are not limited to these embodiments. The scope of the aspects of encoder 100 and decoder 200 may encompasses embodiments obtainable by adding, to any of these embodiments, various kinds of modifications that a person skilled in the art would arrive at without deviating from the scope of the present disclosure and embodiments configurable by arbitrarily combining constituent elements in different embodiments.

One of the aspects may be performed by combining at least part of the other aspects in the present disclosure. In addition, one of the aspects may be performed by combining part of the processing indicated in any of the flowcharts according to one of the aspects, part of the configuration of any of the devices, part of syntaxes, etc.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoding device that employs the image encoding method, an image decoding device that employs the image decoding method, and an image encoding/decoding device that includes both the image encoding device and the image decoding device. Other configurations included in the system may be modified on a case-by-case basis.

[Usage Examples]

Figure 18:
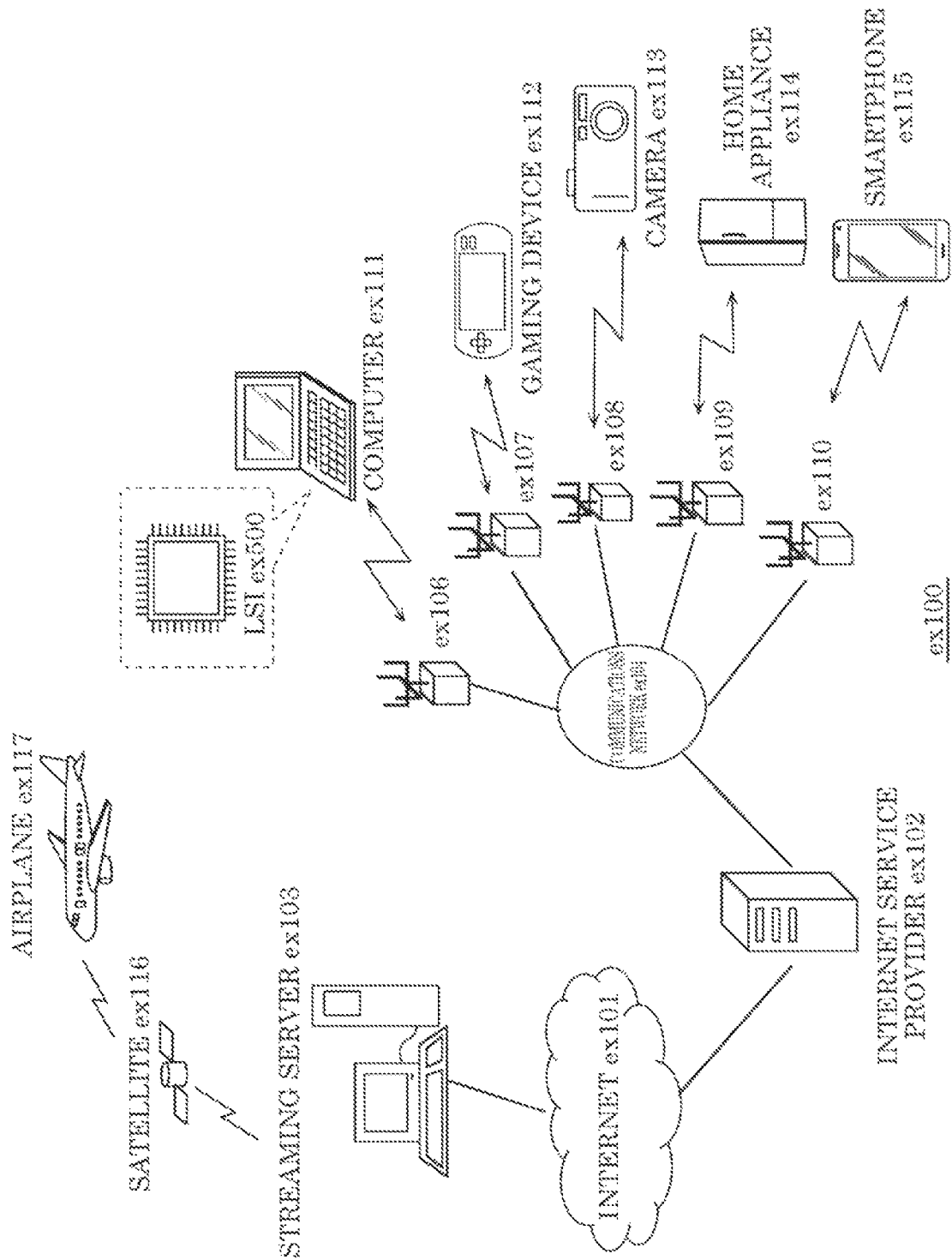
FIG. 18 illustrates an overall configuration of a content providing system for implementing a content distribution service.

FIG. 18 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 19:
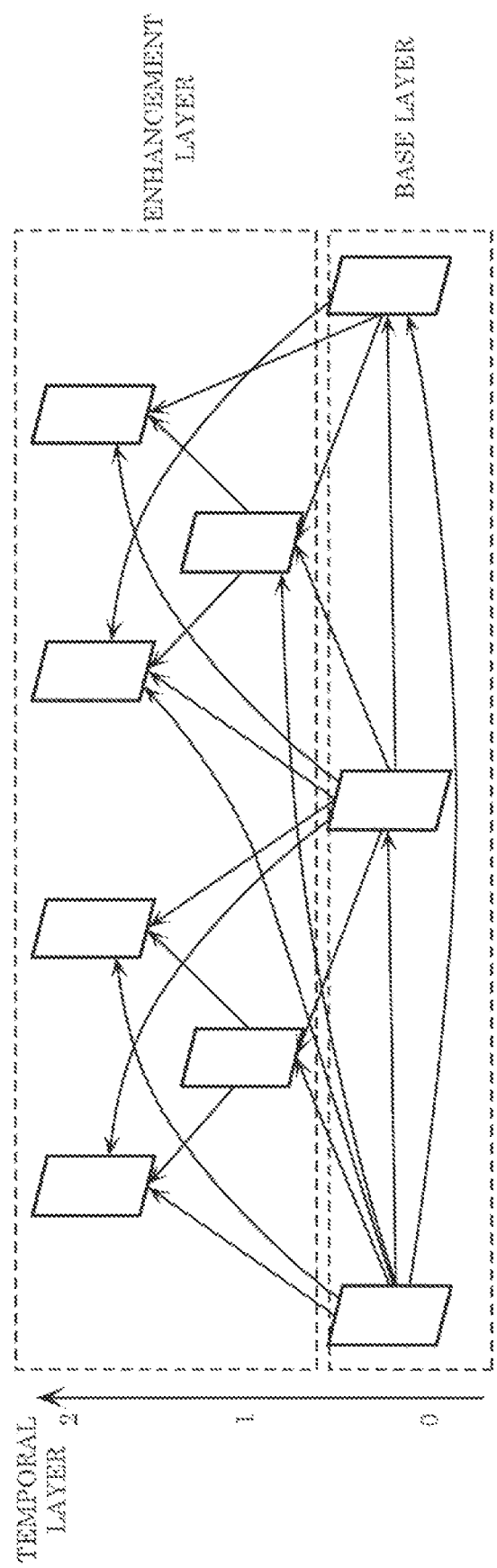
FIG. 19 illustrates one example of encoding structure in scalable encoding.

The switching of content will be described with reference to a scalable stream, illustrated in FIG. 19, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 19. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 20:
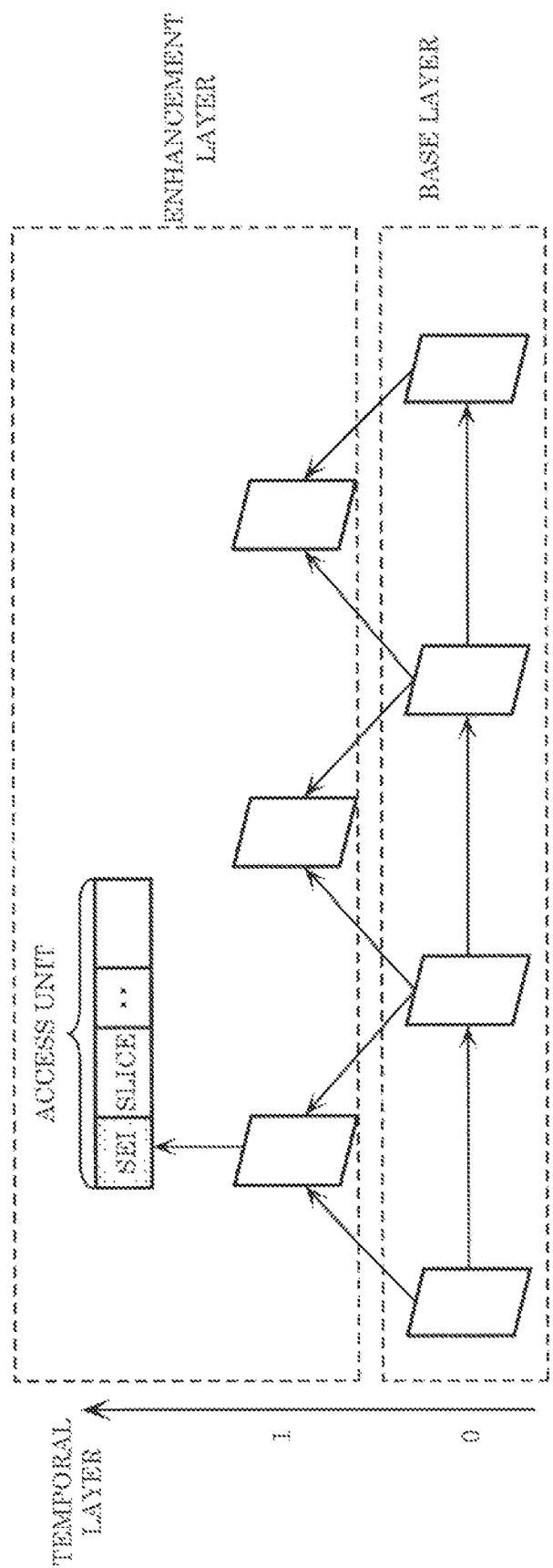
FIG. 20 illustrates one example of encoding structure in scalable encoding.

Alternatively, a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 20, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

[Web Page Optimization]

Figure 21:
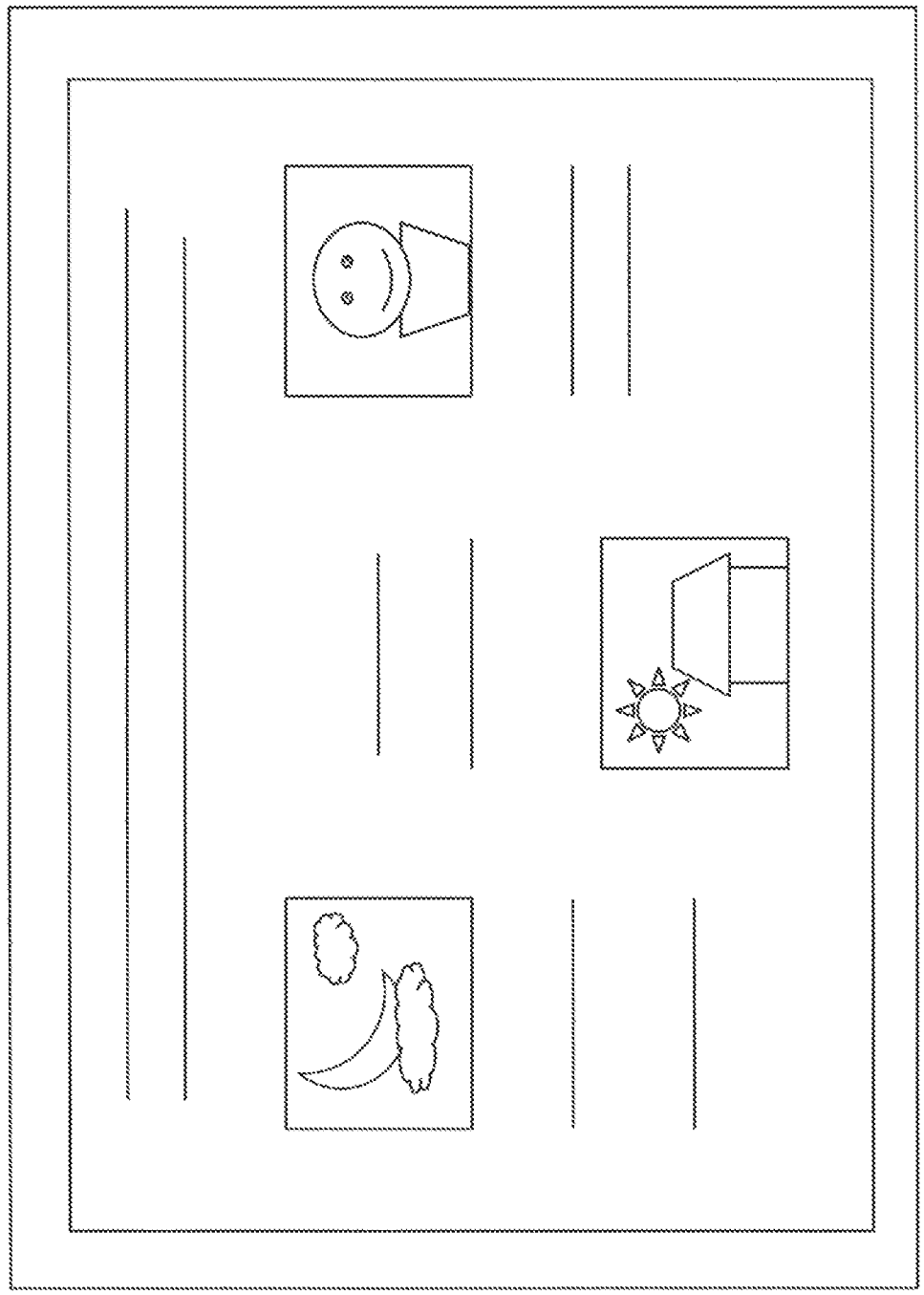
FIG. 21 illustrates an example of a display screen of a web page.
Figure 22:
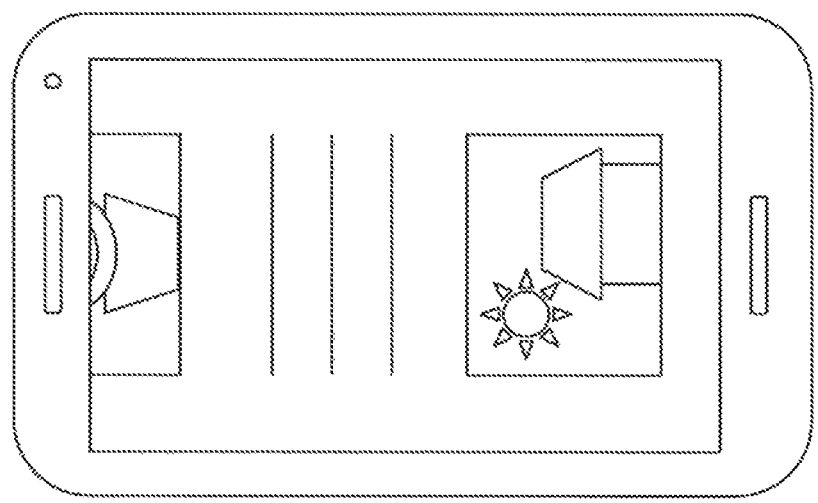
FIG. 22 illustrates an example of a display screen of a web page.

FIG. 21 illustrates an example of a display screen of a web page on, for example, computer ex111. FIG. 22 illustrates an example of a display screen of a web page on, for example, smartphone ex115. As illustrated in FIG. 21 and FIG. 22, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 23:
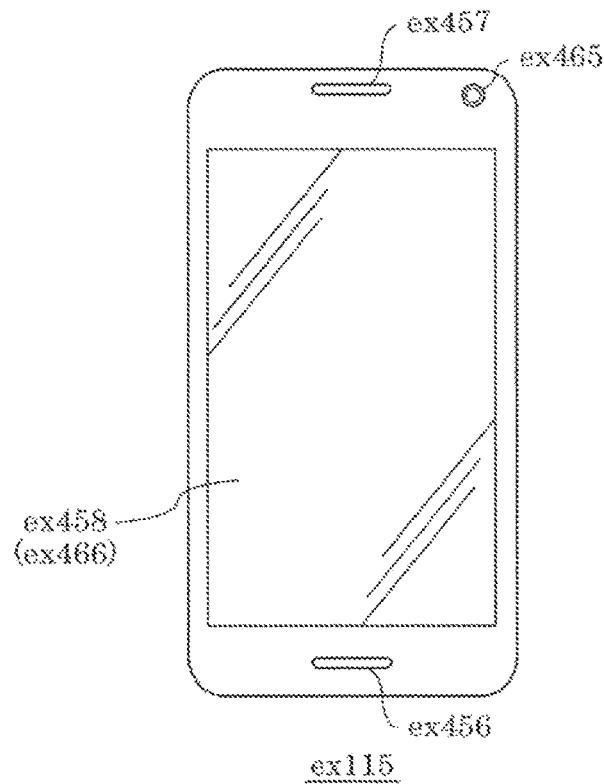
FIG. 23 illustrates one example of a smartphone.
Figure 24:
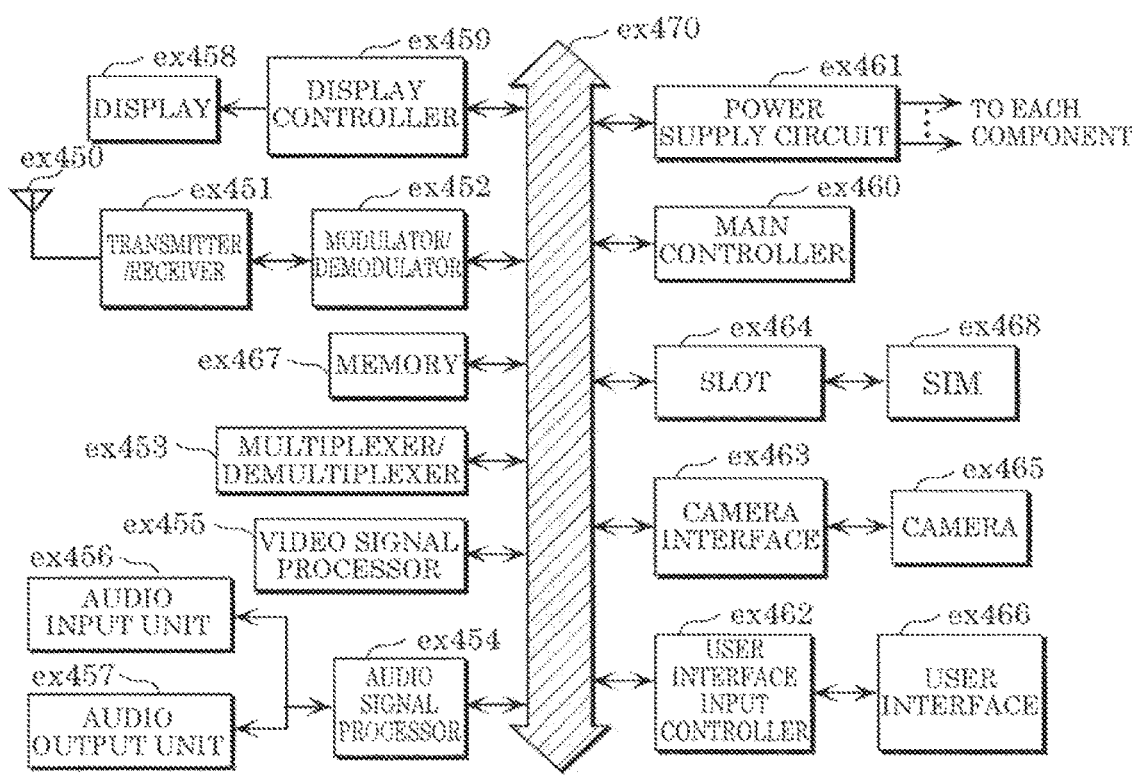
FIG. 24 is a block diagram illustrating a configuration example of a smartphone.

FIG. 23 illustrates smartphone ex115. FIG. 24 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

The invention claimed is:

1. A decoder comprising:
a processor; and
a memory,
wherein the processor, using the memory:
    inverse quantizes data corresponding to a current block of an image;
    performs an inverse secondary transform, using one candidate of the inverse secondary transform selected from candidates of the inverse secondary transform, on a result of the inverse quantization to generate second transform coefficients, the candidates of the inverse secondary transform including transform bases for the inverse secondary transform and a skip of the inverse secondary transform; and
    performs an inverse primary transform, using one candidate of the inverse primary transform selected from candidates of the inverse primary transform, on the second transform coefficients or the result of the inverse quantization to generate first transform coefficients, the candidates of the inverse primary transform including transform bases for the inverse primary transform, wherein
a fixed second candidate is always used for the inverse secondary transform in response to a case of a selected candidate of the inverse primary transform being other than a fixed first candidate, and
the fixed first candidate is always used for the inverse primary transform in response to a case of the selected candidate of the inverse secondary transform being other than the fixed second candidate.

2. A decoding method comprising:
performing inverse quantization of data corresponding to a current block of an image;
performing an inverse secondary transform, using one candidate of the inverse secondary transform selected from candidates of the inverse secondary transform, on a result of the inverse quantization to generate second transform coefficients, the candidates of the inverse secondary transform including transform bases for the inverse secondary transform and a skip of the inverse secondary transform; and
performing an inverse primary transform, using one candidate of the inverse primary transform selected from candidates of the inverse primary transform, on the second transform coefficients or the result of the inverse quantization to generate first transform coefficients, the candidates of the inverse primary transform including transform bases for the inverse primary transform, wherein a fixed second candidate is always used for the inverse secondary transform in response to a case of a selected candidate of the inverse primary transform being other than a fixed first candidate, and
the fixed first candidate is always used for the inverse primary transform in response to a case of the selected candidate of the inverse secondary transform being other than the fixed second candidate.

3. An encoder comprising:
a processor; and
a memory,
wherein the processor, using the memory:
    performs a primary transform, using one candidate of the primary transform selected from candidates of the primary transform, on residual signals of a current block to generate first transform coefficients, the candidates of the primary transform including transform bases for the primary transform;
    performs a secondary transform, using one candidate of the secondary transform selected from candidates of the secondary transform, on the first transform coefficients to generate second transform coefficients, the candidates of the secondary transform including transform bases for the secondary transform and a skip of the secondary transform; and
    quantizes the first transform coefficients or the second transform coefficients to generate quantized coefficients, wherein
a fixed second candidate is always used for the secondary transform in response to a case of a selected candidate of the primary transform being other than a fixed first candidate, and
the fixed first candidate is always used for the primary transform in response to a case of the selected candidate of the secondary transform being other than the fixed second candidate.

4. A non-transitory computer readable medium storing a bitstream, the bitstream comprising:
information according to which a decoder selects a skip of an inverse secondary transform from candidates of inverse secondary transform; and
a picture including a current block on which a decoding process is performed, wherein in the decoding process:
    inverse quantization is performed on data corresponding to the current block of an image;
    an inverse secondary transform is performed, using one candidate of the inverse secondary transform selected from the candidates of the inverse secondary transform, on a result of the inverse quantization to generate second transform coefficients, the candidates of the inverse secondary transform including transform bases for the inverse secondary transform and the skip of the inverse secondary transform; and
    an inverse primary transform is performed, using one candidate of the inverse primary transform selected from candidates of the inverse primary transform, on the second transform coefficients or the result of the inverse quantization to generate first transform coefficients, the candidates of the inverse primary transform including transform bases for the inverse primary transform,
a fixed second candidate is always used for the inverse secondary transform in response to a case of a selected candidate of the inverse primary transform being other than a fixed first candidate, and
the fixed first candidate is always used for the inverse primary transform in response to a case of the selected candidate of the inverse secondary transform being other than the fixed second candidate.

5. An encoding method comprising:

performing a primary transform, using one candidate of the primary transform selected from candidates of the primary transform, on residual signals of a current block to generate first transform coefficients, the candidates of the primary transform including transform bases for the primary transform;

performing a secondary transform, using one candidate of the secondary transform selected from candidates of the secondary transform, on the first transform coefficients to generate second transform coefficients, the candidates of the secondary transform including transform bases for the secondary transform and a skip of the secondary transform; and quantizing the first transform coefficients or the second transform coefficients to generate quantized coefficients, wherein a fixed second candidate is always used for the secondary transform in response to a case of a selected candidate of the primary transform being other than a fixed first candidate, and the fixed first candidate is always used for the primary transform in response to a case of the selected candidate of the secondary transform being other than the fixed second candidate.

* * * * *